(12) United States Patent
Miyazawa

(10) Patent No.: US 6,909,223 B2
(45) Date of Patent: Jun. 21, 2005

(54) ROTATION/DISPLACEMENT CONVERTING ACTUATOR

(75) Inventor: Osamu Miyazawa, Suwa (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 10/385,299

(22) Filed: Mar. 10, 2003

(65) Prior Publication Data

US 2004/0080243 A1 Apr. 29, 2004

(30) Foreign Application Priority Data

Mar. 11, 2002 (JP) .......................................... 2002-066054

(51) Int. Cl.[7] .............................................. H01L 41/08
(52) U.S. Cl. .......................... 310/328; 310/330; 310/331; 310/333; 310/323.01; 310/323.06; 310/323.14; 310/15; 310/17; 310/20
(58) Field of Search ................................ 310/328, 330, 310/331, 333, 323.01, 323.06, 323.14, 15, 17, 20

(56) References Cited

U.S. PATENT DOCUMENTS

| | | | | |
|---|---|---|---|---|
| 4,871,939 A | * | 10/1989 | Clouser | 310/332 |
| 5,905,327 A | * | 5/1999 | Ooi et al. | 310/328 |
| 6,765,334 B1 | * | 7/2004 | Iino et al. | 310/323.02 |
| 2004/0027032 A1 | * | 2/2004 | Moteki et al. | 310/323.02 |

FOREIGN PATENT DOCUMENTS

| | | | | |
|---|---|---|---|---|
| JP | 05-116787 | | 5/1993 | ............ H02N/2/00 |
| JP | 2000-188882 | | 7/2000 | ............ H02N/2/00 |
| JP | 2000333480 A | * | 11/2000 | ............ H02N/2/00 |
| JP | 2001286167 A | * | 10/2001 | ............ H02N/2/00 |

OTHER PUBLICATIONS

Communication from PCT re: corresponding International Application No. PCT/JP03/02804.

* cited by examiner

Primary Examiner—Darren Schuberg
Assistant Examiner—J. Aguirrechea
(74) Attorney, Agent, or Firm—Harness, Dickey & Pierce, P.L.C.

(57) ABSTRACT

A rotation/displacement converting actuator has an actuator unit constituted by a displacing body and an actuator in which the displacing body can be linearly displaced. The actuator has a pair of plate-shaped bases, a rotor, a vibrating element that rotates the rotor, and a cam mechanism for converting rotary motion of the rotor to linear motion of the displacing body. The rotor is fixed to a shaft to which the rotor (cam rotor) is fixed. An outer circumferential surface of the rotor constitutes a cam surface of the cam mechanism. A roller is provided at a tip portion of the displacing body. The roller abuts on the outer circumferential surface (cam surface) of the rotor.

18 Claims, 25 Drawing Sheets

US 6,909,223 B2

ROTATION/DISPLACEMENT CONVERTING ACTUATOR

TECHNICAL FIELD

The present invention relates to a rotation/displacement converting actuator.

BACKGROUND ART

As a linear actuator that lineally moves a displacing body is known e.g., a device provided with a motor (rotation-typed actuator), a decelerating unit that decelerates and transmits rotational driving force of the motor, and a rack-and-pinion unit that converts; the rotary motion to linear motion.

However, there is a problem that it is hard to allow the actuator to be more miniaturized, lighter and particularly thinner, since the above-mentioned conventional linear actuator needs to have the decelerating unit and the motor of the actuator is bulky.

Further, the configuration of the actuator is complicated, and there occurs a big noise.

Furthermore, there is also a problem that an electromagnetic noise that the motor occurs might provide harmful affects against any other equipment.

Here, Japanese Laid-open Patent Application No. 2001-161084 discloses a linear-moving mechanism having a cam mechanism that converts rotary motion of a rotor, which is driven by an ultrasonic motor, to linear motion of a displacing body.

However, driving force (driving torque), a driving speed, and a driving efficiency of the linear-moving, mechanism disclosed in the above application have been insufficient in view of a configuration of the ultrasonic motor to be used.

As the other one of defects of the above mentioned linear-moving mechanism, since frictional force is provided between the rotor and a vibrating element by applying pushing force against the rotor in a direction of an shaft of the rotor so that the driving force is obtained, in a case where the pushing force in the direction of the shaft of the rotor is changed, the driving characteristic undergoes great change. In other words, as shown in FIGS. 1 and 2 of the above application, in such a system in which a displacing body 14 abuts on a cam (its outer circumferential surface) 13 from a lateral direction of a rotor 4, pushing force in the axle direction of the rotor 4 is greatly affected by such a lateral pressure added from the displacing body 14 onto the cam 13. Thus, the driving characteristic undergoes great change. On the other hand, as shown in FIG. 4 of the above application, in a system in which the displacing body 14 abuts on the cam (its lateral face) 13 from the direction of the shaft of the rotor 4, pushing force in the shaft of the rotor 4 is directly affected thereto. Thus, the driving characteristic also undergoes great change.

SUMMARY OF THE INVENTION

It is an object of the present invention to provide a rotation/displacement converting actuator that has a simplified configuration, and advantage to be miniaturized, particularly thinner, which can accurately and surely displace (reciprocate) a displacing body in a desired direction.

In order to achieve the above-mentioned object, a rotation/displacement converting actuator of one aspect of the present invention comprises: a rotor provided in a rotatable manner; a vibrating element which includes a first piezoelectric element that undergoes extension and contraction by application of an AC voltage, a reinforcing plate having an abutting portion and an arm portion, and a second piezoelectric element that undergoes extension and contraction by application of an AC voltage, the first piezoelectric element, the reinforcing plate and the second piezoelectric element being laminated in this order, and the vibrating element being supported by the arm portion so that the abutting portion abuts on said rotor wherein said vibrating element undergoes vibration by applying an AC voltage to the first and second piezoelectric elements so that said vibrating element repeatedly applies force to said rotor by the vibration to rotate said rotor; a displacing body movably provided in a desired direction in a plane same as a plane in which he vibration occurs or in a plane substantially parallel with a plane in which the vibration occurs; and a converting mechanism for converting rotary motion of said rotor to reciprocal motion of said displacing body.

Thus, the displacing body can be accurately and surely displaced (reciprocate) in a desired direction.

Further, the vibrating element rotates the rotor, rotary motion of the rotor is converted to reciprocal motion of the displacing body to drive the displacing body, thereby miniaturizing (particularly making thinner) the entire rotation/displacement converting actuator.

Further, because the actuator has a decelerating function, the displacing body can be displaced (driven) with great force in comparison with a case where the vibrating element directly drives the displacing body.

Further, the configuration of the actuator can be simplified and its cost of production can be reduced.

Further, harmful effects against peripheral equipments can be prevented, because no or little electromagnetic noise occurs in the actuator in order not to utilize any ordinary motor.

Furthermore, particularly, the vibrating element includes a first piezoelectric element that undergoes extension and contraction by application of an AC voltage, a reinforcing plate having an abutting portion and an arm portion, and a second piezoelectric element that undergoes extension and contraction by application of an AC voltage, and the first piezoelectric element, the reinforcing plate and the second piezoelectric element are laminated in this order. Thus, great driving force and a high driving speed can be obtained at a low voltage. Also, the drive efficiency can be extremely enhanced because the actuator undergoes extension and contraction in a plane.

In the rotation/displacement converging actuator of the present invention, it is preferred that the vibrating element, the rotor, and the displacing body are respectively arranged in mutually substantially parallel planes, and the vibration of the vibrating element and the reciprocal motion of the displacing body are performed in the respective parallel planes.

An rotation/displacement converting actuator of the other aspect of the present invention comprises: a rotor provided in a rotatable manner; a vibrating element which includes a first piezoelectric element that undergoes extension and contraction by application of an AC voltage, a reinforcing plate having an abutting portion and an arm portion, and a second piezoelectric element that undergoes extension and contraction by application of an AC voltage, the first piezoelectric element, the reinforcing plate and the second piezoelectric element being laminated in this order, and the vibrating element being supported by the arm portion so that the abutting portion abuts on said rotor wherein said vibrating element undergoes vibration by applying an AC voltage to the first and second piezoelectric elements so that said vibrating element repeatedly applies force to said rotor by the vibration to rotate said rotor; a displacing body provided in a linearly movable manner; and a converting mechanism for converting rotary motion of said rotor to reciprocal motion of said displacing body.

Thus, the displacing body can be accurately and surely displaced (reciprocate) lineally.

Further, the vibrating element rotates the rotor, and rotary motion of the rotor is converted to linear motion of the displacing body to drive the displacing body, thereby miniaturizing (particularly making thinner) the entire rotation/displacement converting actuator.

Further, because the actuator has a decelerating function, the displacing body can be displaced (driven) with great force in comparison with a case where the vibrating element directly drives the displacing body.

Further, the configuration of the actuator can be simplified and its cost of production can be reduced.

Further, harmful effect against peripheral equipments can be prevented, because no or little electromagnetic noise occurs in the actuator in order to utilize any ordinary motor.

Furthermore, particularly, the vibrating element includes a first piezoelectric element that undergoes extension and contraction by application of an AC voltage, a reinforcing plate having an abutting portion and an arm portion, and a second piezoelectric element that undergoes extension and contraction by application of an AC voltage, and the first piezoelectric element, the reinforcing plate and the second piezoelectric element are laminated in this order. Thus, great driving force and a high driving speed can be obtained at a low voltage. Also, the drive efficiency can be extremely enhanced because the actuator undergoes extension and contraction in a plane.

In the rotation/displacement converting actuator of the present invention, preferably, the converting mechanism includes a cam mechanism provided with a cam having a cam surface.

In the rotation/displacement converting actuator of the present invention, it is preferred that the vibrating element, the rotor, and the displacing body are respectively provided in mutually substantially parallel planes, and the vibration of the vibrating element and the reciprocal motion of the displacing body are performed in the respective parallel planes.

In the rotation/displacement converting actuator, it is preferred that the cam of the cam mechanism rotates together with the rotor.

In the rotation/displacement converting actuator, it is preferred that the cam is provided on the rotor.

In the rotation/displacement converting actuator, it is preferred that the rotor has an outer circumferential surface on which the vibrating element abuts, and the distance between the outer circumferential surface and the center of rotation of the rotor is longer than a maximum distance from the center of rotation of the cam to the cam surface of the cam.

In the rotation/displacement converting actuator, it is preferred that the rotor has an inner circumferential surface on which the vibrating element abuts from inside of the rotor.

In the rotation/displacement converting actuator, it is preferred that the cam surface of the cam mechanism is provided outwardly from the inner circumferential surface in a radial direction thereof.

In the rotation/displacement converting actuator, it is preferred that the cam of the cam mechanism includes a cam recess.

In the rotation/displacement converting actuator, it is preferred that the displacing body has an abutting portion in which the displacing body abuts on the cam surface of the cam mechanism, and the actuator further comprises biasing means for biasing the displacing body so that the abutting portion abuts on the cam surface.

In the rotation/displacement converting actuator, it is preferred that the portion of the rotor on which the vibrating element abuts and the cam surface of the cam mechanism are located in a substantially same plane.

In the rotation/displacement converting actuator, it is preferred that the cam is provided on the displacing body.

In the rotation/displacement converting actuator, it is preferred that the converting mechanism includes a crank mechanism.

In the rotation/displacement converting actuator, it is preferred that the crank mechanism has a crank rod, and the vibrating element, the rotor, the crank rod of the crank mechanism, and the displacing body are respectively provided in mutually substantially parallel planes, and the vibration of the vibrating element and the displacement of the displacing body are performed in the respective parallel planes.

In the rotation/displacement converting actuator, it is preferred that the crank mechanism has a crank rod with both ends, and each of the both ends of the crank rod is respectively coupled to the rotor and the displacing body by a crank pin.

In the rotation/displacement converting actuator, it is preferred that the rotor has an outer circumferential surface on which the vibrating element abuts, and the distance between the outer circumferential surface and the center of rotation of the rotor is longer than a distance from the center of rotation of the rotor to the crank pin.

In the rotation/displacement converting actuator, it is preferred that the displacing body is constituted so as to perform the reciprocal motion by the rotary motion of the rotor in one direction.

In the rotation/displacement converting actuator, it is preferred that the actuator further comprises displacement restricting means for restricting displacement of the displacing body.

In the rotation/displacement converting actuator, it is preferred that the vibrating element abuts on the rotor from a radial direction of the rotor.

Thus, it is more advantageous that the rotation/displacement converting actuator is made to be thinner. Also, greater driving force (driving torque) can be obtained. As a result, the displacing body can be more surely displaced (reciprocate).

In the rotation/displacement converting actuator, it is preferred that the rotor has a circumferential surface, and the vibrating element abuts on the circumferential surface of the rotor.

Thus, even when pushing force from the displacing body onto the rotor and a load that is added to the displacing body are changed, no effect is given to the pushing force of the vibrating element onto the rotor. Therefore, the driving characteristic of the actuator is stable so that the actuator can be (stably) driven.

Further, it is more advantageous that the rotation/displacement converting actuator is made to be thinner. Also, greater driving force (driving torque) can be obtained. As a result, the displacing body can be more surely displaced (reciprocate).

Furthermore, selection of higher torque (higher driving force) and higher speed can be easily established by changing a diameter of the rotor.

BRIEF DESCRIPTION OF THE DRAWINGS

The preferred embodiments of the rotation/displacement converting actuator are described below with reference to the appended drawings.

PREFERRED EMBODIMENTS OF THE INVENTION

The preferred embodiments of the rotation/displacement converting actuator of the present invention will be described below with reference to the appended drawings.

Figure 1:
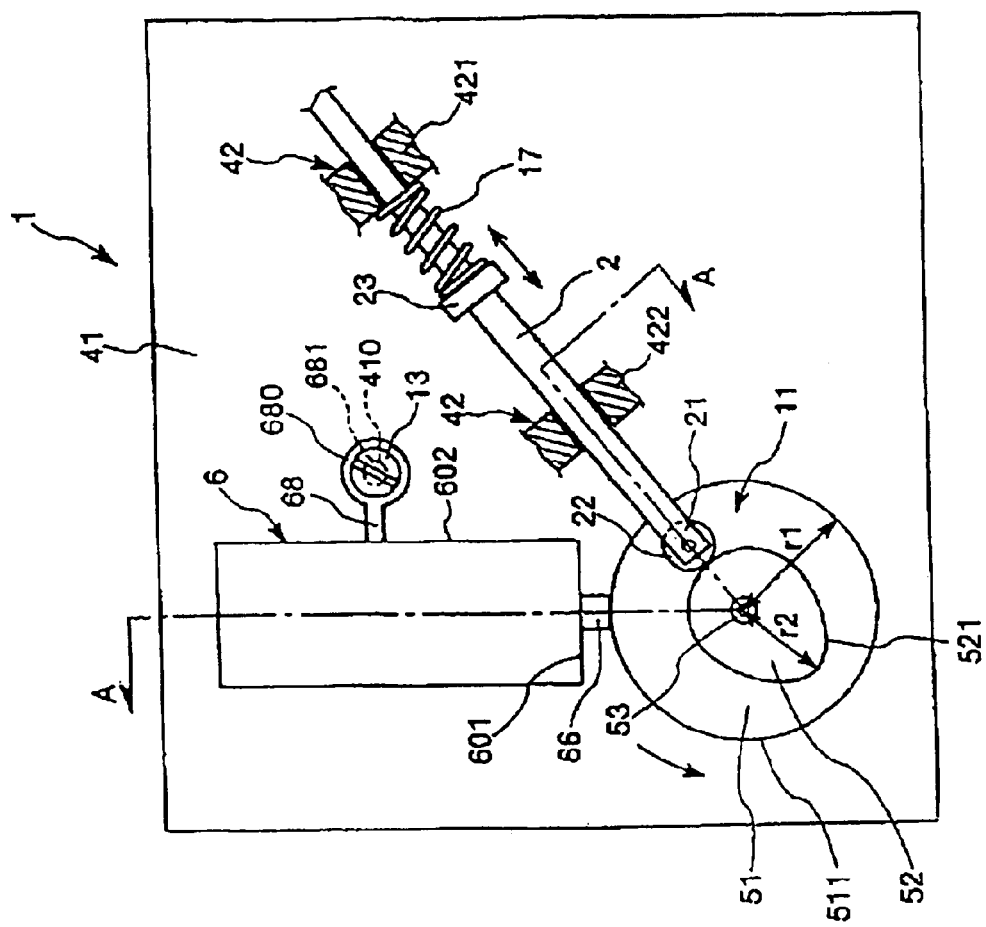
FIG. 1 is a plan view showing a first embodiment of the rotation/displacement converting actuator according to the present invention.
Figure 2:
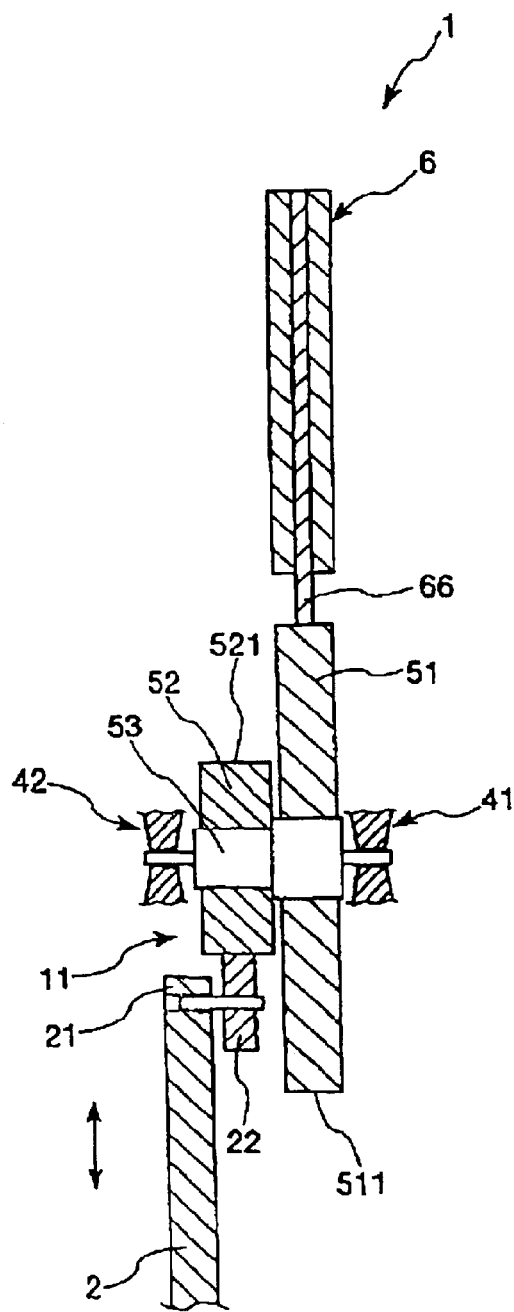
FIG. 2 is a sectional view taken along line A—A of the rotation/displacement converting actuator shown in FIG. 1.
Figure 3:
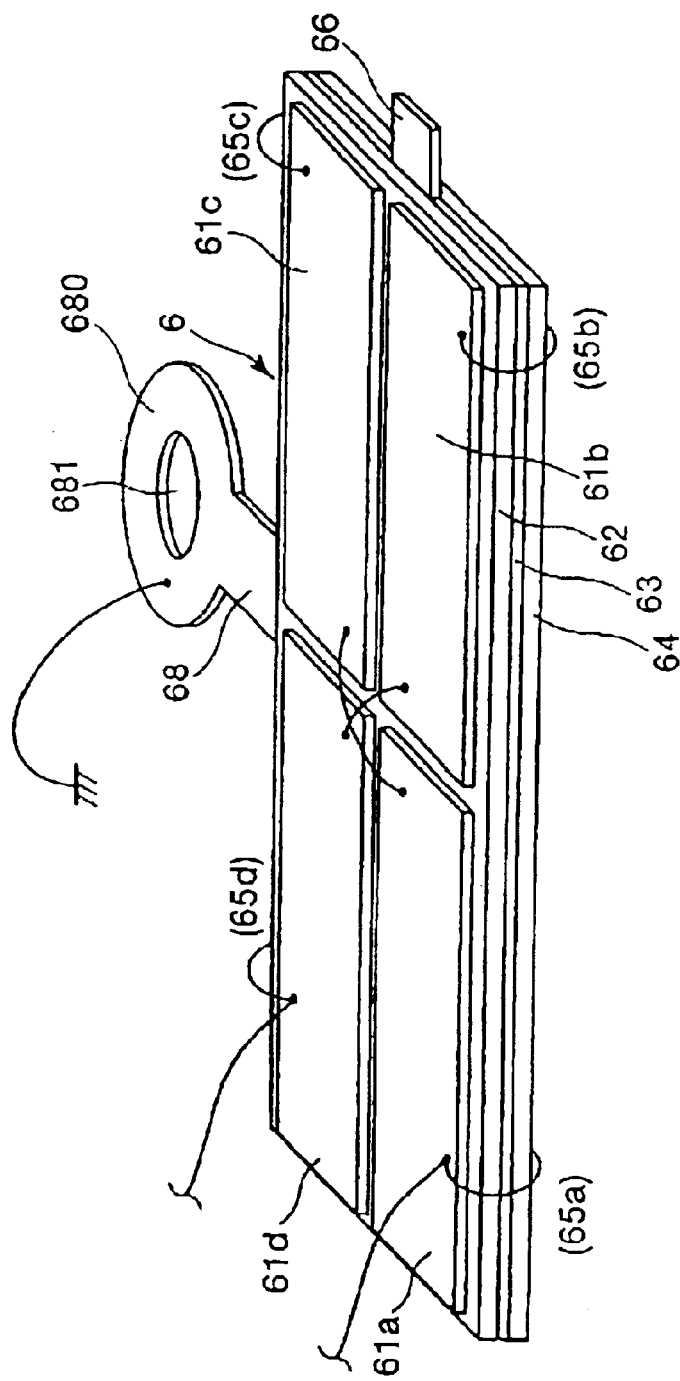
FIG. 3 is a perspective view of a vibrating element in the rotation/displacement converting actuator shown in FIG. 1.
Figure 4:
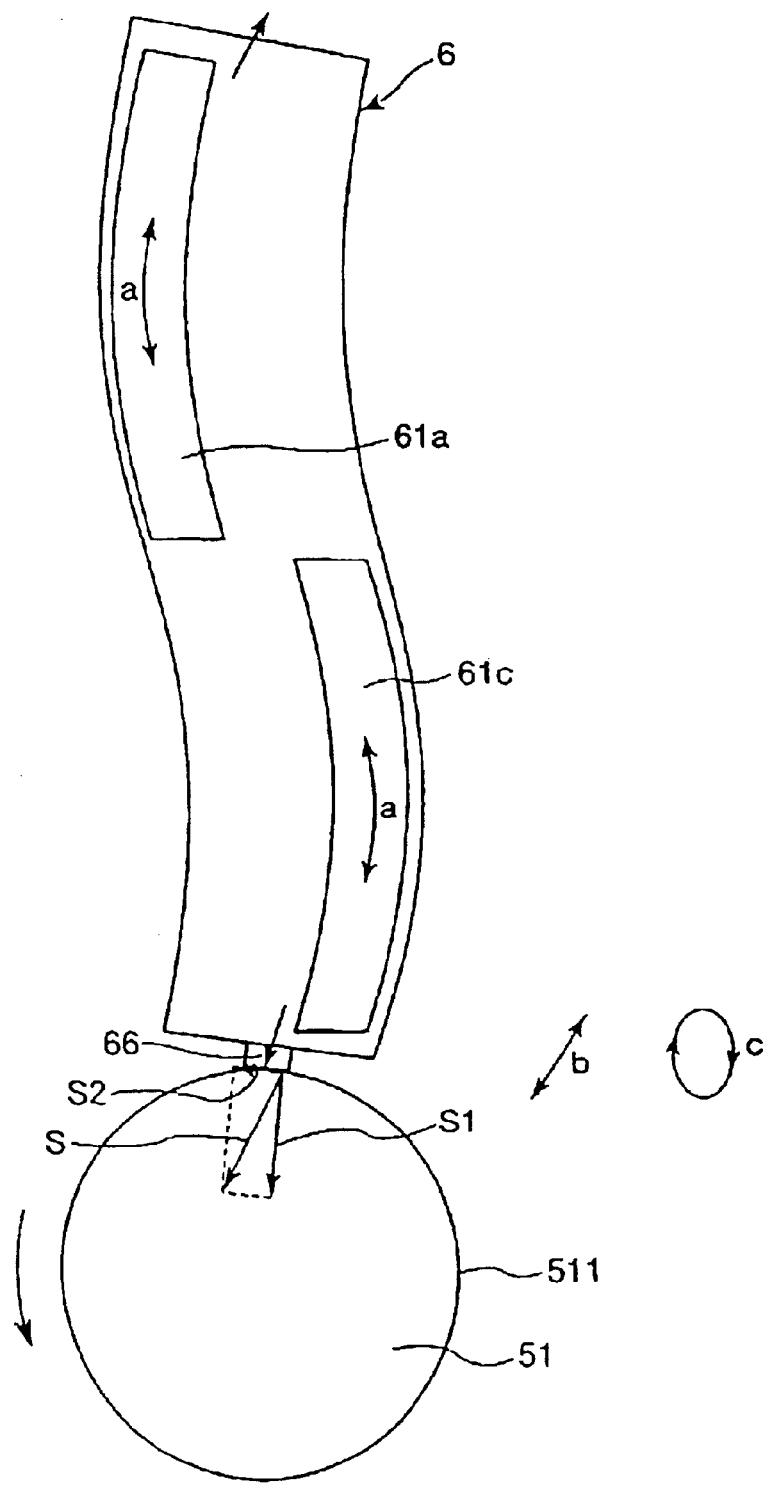
FIG. 4 is a plan view showing one mode of vibration of the vibrating element in the rotation/displacement converting actuator shown in FIG. 1.
Figure 5:
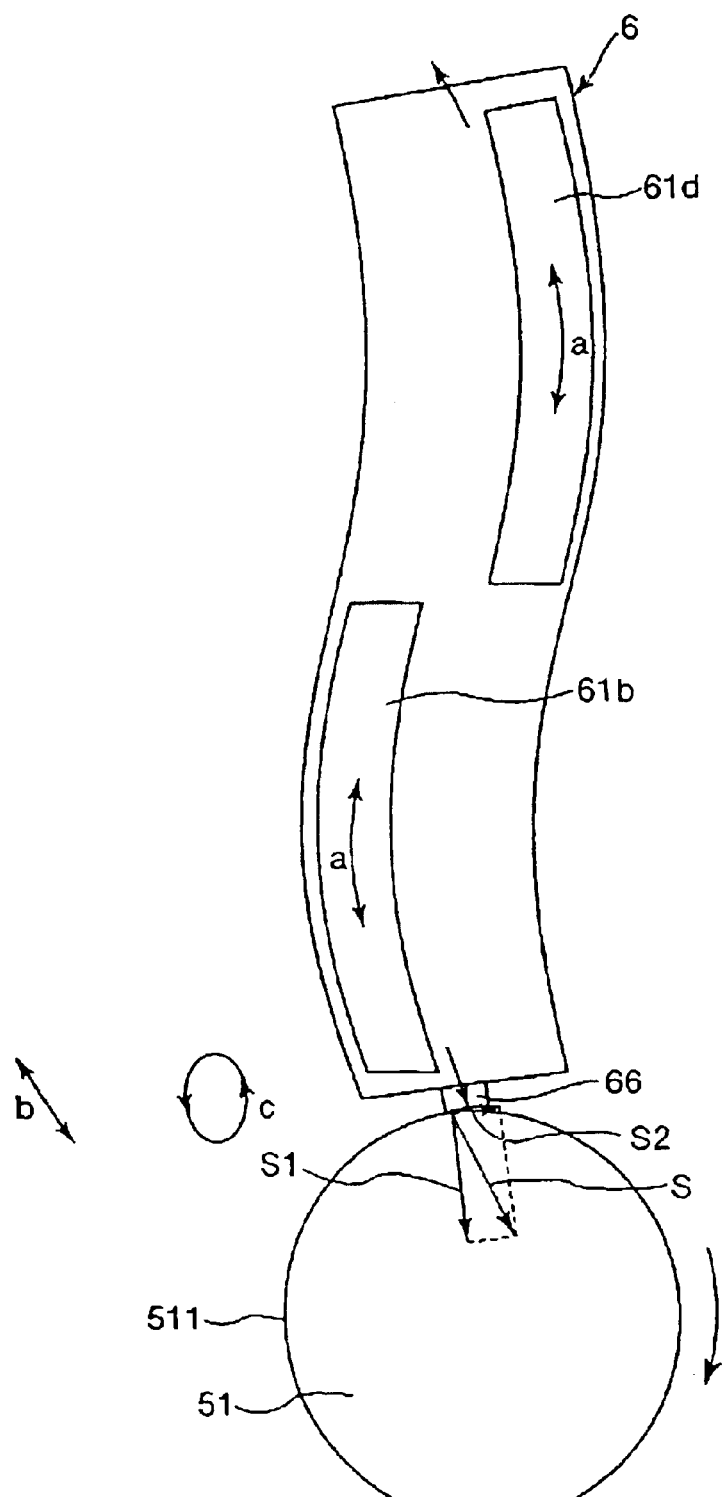
FIG. 5 is a plan view showing another mode of vibration of the vibrating element in the rotation/displacement converting actuator shown in FIG. 1.
Figure 6:
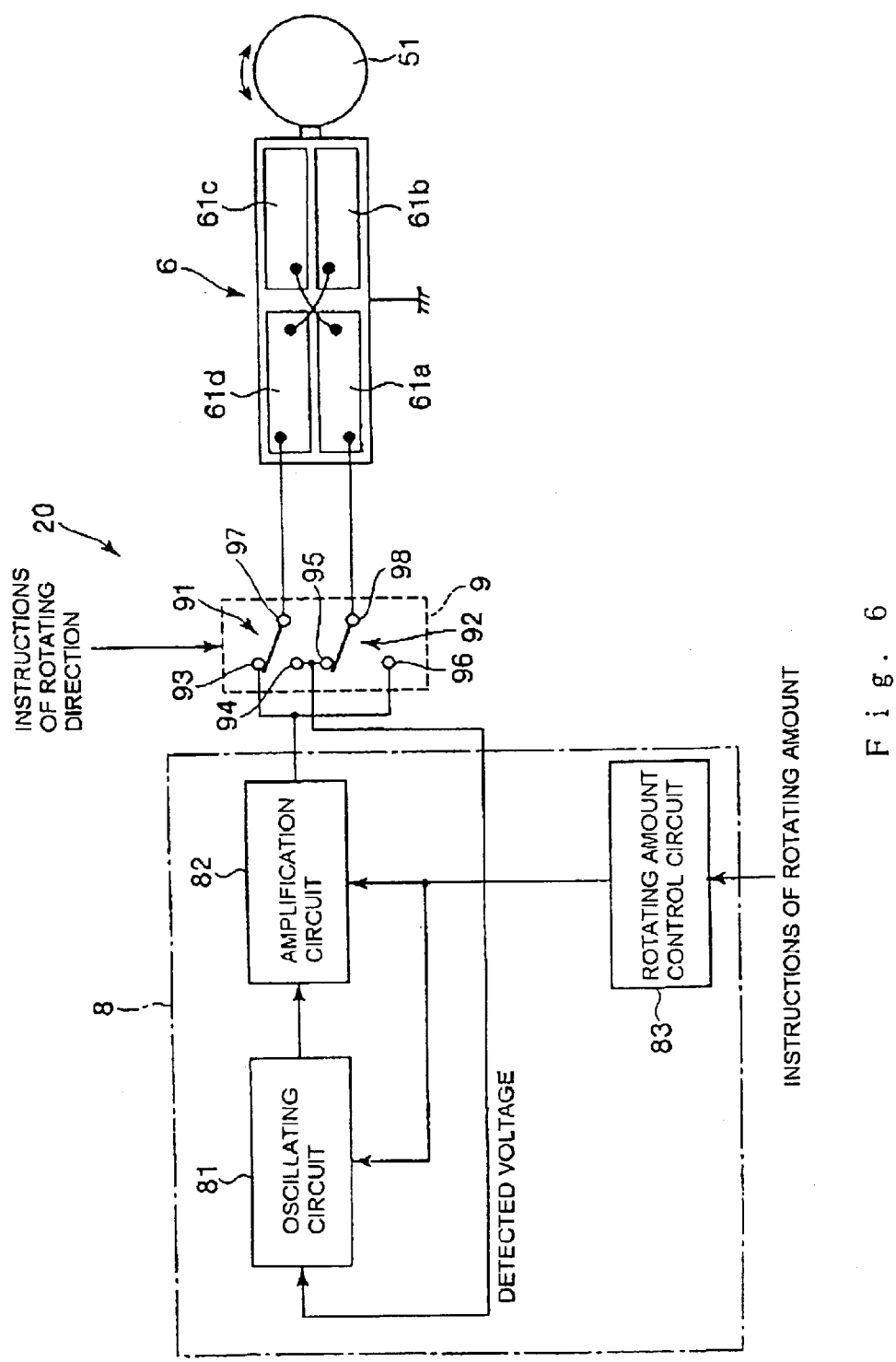
FIG. 6 is a block diagram showing a circuit configuration of the rotation/displacement converting actuator shown in FIG. 1.

FIG. 1 is a plan view showing the first embodiment of the rotation/displacement converting actuator according to the present invention. FIG. 2 is a sectional view (a section and elevation view) taken along line A—A of the rotation/displacement converting actuator shown in FIG. 1. FIG. 3 is a perspective view of a vibrating element in the rotation/displacement converting actuator shown in FIG. 1. FIGS. 4 and 5 are respectively plan views showing modes of vibration of the vibrating element in the rotation/displacement converting actuator shown in FIG. 1 that undergoes vibration. FIG. 6 is a block diagram showing a circuit configuration of the rotation/displacement converting actuator shown in FIG. 1.

Here, a base 42 is partially shown in FIG. 1, and bases 41 and 42 are respectively partially shown in FIG. 2. In following explanations using FIG. 1, an upper side, a lower side, a right side, and a left side are simply referred to as "upper", "lower", "right" and "left".

The rotation/displacement converting actuator 1 shown in these drawings is an actuator that linearly displaces (reciprocates, i.e., moves in a reciprocal manner) a displacing body 2.

As shown in FIGS. 1, 2 and 6, in addition to the displacing body 2, the rotation/displacement converting actuator has a pair of plate-shaped bases (substrates) 41, 42 so as to be arranged in a mutually parallel and opposing manner; a rotor 51; a vibrating element 6 that rotates the rotor 51; a cam mechanism (converting mechanism) 11 that converts the rotary motion of the rotor 51 into the linear motion (reciprocal motion) of the displacing body 2; a conducting circuit 20 that selects a conducting pattern to each of electrodes of the vibrating element 6 (described later) and thereafter conducts electricity to the selected electrodes. The base 41 is disposed at a right end in FIG. 2, while the base 42 is disposed at a left end in FIG. 2. The vibrating element 6, the rotor 51, the cam mechanism 11, and the displacing body 2 are respectively disposed between the base 41 and the base 42.

The rotor 51 is disk-shaped, which is fixed to a shaft 53 that is located at the center of the rotor 51. The shaft 53 is provided so that the rotor 51 can be rotated in forward and reverse directions at the base 41 and the base 42, and so that the rotor 51 (specifically, a lateral face of the rotor 51) is in parallel with the base 41 and the base 42.

Needless to say, the rotor 51 is not limited to be disk-shaped.

Further, since a rotor (cam rotor) 52 in which a cam of the cam mechanism 11 is provided is fixed to the shaft 53, the rotor 51 and the rotor 52 are rotated together (i.e., cooperatively rotated).

An outer circumferential surface 521 of the rotor 52 is formed as a cam surface of the cam mechanism 11. Therefore, hereinafter, the "outer circumferential surface 521" may be also merely called "cam surface 521".

Here, the rotor 52 may be fixed to the rotor 51 (specifically, the lateral face of the rotor 51), for example. Alternatively, the rotor 51 and the rotor 52 may be integrally formed (as a single member). In other words, the cam (the cam surface) may be provided on the rotor 51.

The vibrating element 6 is plate-shaped, which is provided on the base 41 in parallel with the base 41 and located at an upper side of the rotor 51.

A short side 601 of the vibrating element 6 lies in its right-and-left direction, while a long side 602 of the vibrating element 6 lies in its upper-and-lower direction. Further, a tip portion of a protruding portion (contacting portion) 66 of the vibrating element 6 abuts on an outer circumferential surface 511 from the upper side of the rotor 51. In other words, the tip portion of the protruding portion 66 of the vibrating element 6 abuts on the outer circumferential surface (abutting portion) 511 from a radial direction of the rotor 51. Since vibration of the vibrating element 6 provides driving force (turning force) from the protruding portion 66 to the rotor 51, the rotor 52 is rotated together with the rotor 51. Here, details of the vibrating element 6 will be hereinafter described.

The displacing body 2 is preferably formed using a rigid body i.e., the displacing body 2 ought to have a proper rigidity.

In the present embodiments, the displacing body 2 is bar-shaped. The displacing body 2 is provided at the base 42 in parallel with the base 42 so that the displacing body 2 can be moved linearly in its longitudinal direction (the shaft direction) of the displacing body 2.

A roller (especially, its abutting portion) 22 is provided at a tip portion 21 of the displacing body 2 in parallel with the roller 51 and the roller 52, and can be rotated in the forward and reverse directions. The roller 22 abuts on the outer circumferential surface (cam surface) 521 of the roller 52.

A flange 23 is formed in the middle of the displacing body 2. The flange 23 is located between a supporting portion 421 and a supporting portion 422 of the displacing body 2, which are provided in the base 42.

A coil spring (elastic member) 17 as a biasing means is provided in a contracted state between the supporting portion 421 provided at a base end side of the displacing body 2 and the flange 23. The displacing body 2 is biased toward the tip portion 21 (in a direction of the rotor 52) by force of restitution (i.e., elastic force) of the coil spring 17. Thus, the state can be maintained (held) where the roller (especially, its abutting portion) 22 abuts on the cam surface 521.

In this case, the displacing body 2 is not limited to be bar-shaped. For example, the displacing body 2 may be substantially plate-shaped or the like.

A principal part of the cam mechanism 11 is constituted using the rotor 52 and the roller 22. If the rotor 52 is rotated in a predetermined direction (one direction), then the roller 22 is rotated along the cam surface 521. Thus, that the displacing body 2 reciprocates in a longitudinal direction of the displacing body 2.

Here, a radius r1 of a portion (outer circumferential surface 511) where the rotor 51 abuts on the vibrating element 6 is longer than a maximum length r2 max of a distance r2 from a rotational center of the rotor 52 (rotational center of the cam) to the cam surface 521.

As a result, a decelerating function can be established therein and the driving force of the vibrating element 6 can be increased. Namely, additional variable speed mechanism (decelerating mechanism) is not required. Since the driving force of the vibrating element 6 can be increased, the displacing body 2 can be moved (driven) with relatively great force.

As mentioned above, the vibrating element 6, the rotor 51, the rotor 52 (especially, cam surface 521), and the displacing body 2 are respectively provided on mutually substantially parallel planes. Further, the vibrating element 6 undergoes vibration in a plane corresponding to the vibrating element 6 and the displacing body 2 is displaced (reciprocates) in a plane corresponding to the displacing body 2. Namely, the vibrating element 6 undergoes vibration in a plane where the vibrating clement 6 exists and the displacing body 2 is displaced (reciprocates) on a plane where the displacing body 2 exists.

Further, the vibrating element 6 and the rotor 51 are located on a substantially same plane. The rotor 52 and the roller 22 are located on a substantially same plane.

Thus, it is especially advantageous to allow the entire rotation/displacement converting actuator 1 to be thinner.

If the vibrating element 6 undergoes vibration, then the rotor 51 repeatedly receives driving force (i.e., turning force) from the vibrating element 6, thereby rotating the rotor 51. The displacing body 2 is displaced, i.e., reciprocates in its longitudinal direction by the cam mechanism 11.

The vibrating element 6 is smaller (especially thinner) than a normal motor or the like.

According to the present invention, since the displacing body 2 is displaced using the vibrating element 6, the entire rotation/displacement converting actuator 1 can be miniaturized, especially become thinner in its thickness (that focuses on miniaturizing the entire one in its right-and-left direction in FIG. 2).

The rotation/displacement converting actuator 1 can freely select vertically and/or bending vibration modes on a plane, by dividing an electrode of the vibrating element 6 into plural sections, selectively applying a voltage to any of the plural sections, and partially driving a piezoelectric element. In other words, a vibrating pattern (vibrating state) of the vibrating element 6 is changed by selecting any of conducting patterns (conducting states) to each of the electrodes of the vibrating element 6, thereby changing a vibrating direction (vibrating displacement) of the protruding portion 66 of the vibrating element 6. Thus, the rotor 51 can be rotated either counterclockwise or clockwise (in both forward and reverse directions) (Thus, the rotating direction of the rotor 51 can be switched.). Hereinafter, this configuration will be described based on following specific examples.

As shown in FIGS. 3 and 4, the vibrating element 6 is substantially rectangular and plate-shaped. Seen from the upper side of FIG. 3, the vibrating element 6 is constituted by orderly laminating: four electrodes 61a, 61b, 61c, and 61*d*; a plate-shaped piezoelectric element (first piezoelectric element) 62; an reinforcing plate (simultaneously serving as a vibrating plate) 63; a plate-shaped piezoelectric element (second piezoelectric element) 64; and four plate-shaped electrodes 65*a*, 65*b*, 65*c*, and 65*d*. (The electrodes 65*a*, 65*b*, 65*c*, and 65*d* are not shown in FIG. 3, but these reference numerals are merely labeled using parentheses.) In this case, thickness of each of the above-mentioned elements is shown exaggerated in FIGS. 3 and 4.

The piezoelectric elements 62, 64 are rectangular, which undergo expansion and contraction in their longitudinal directions (i.e., in their long-side directions) by applying an AC voltage to the elements 62, 64. Material to constitute the piezoelectric elements 62, 64 is not especially limited. For example, it is possible to use various kinds of materials such as Lead Zirconate Titanate (PZT), Quartz Crystal, Lithium Niobate, Barium Titanate, Lead Titanate, Lead Metaniobate, Polyvinylidene Fluoride, Zinc Lead Niobate, Scandium Lead Niobate, and the like.

The piezoelectric elements 62, 64 are fixed to both faces of the reinforcing plate 63, respectively.

In the vibrating element 6, the piezoelectric element 62 is substantially equally divided (partitioned) into four rectangular areas. The rectangular electrodes 61*a*, 61*b*, 61*c*, and 61*d* are respectively disposed at the divided areas. In a same way, the piezoelectric element 64 is divided (partitioned) into four rectangular areas. The rectangular electrodes 65*a*, 65*b*, 65*c*, and 65*d* are respectively disposed at the divided areas. In this case, the electrodes 65*a*, 65*b*, 65*c*, and 65*d* are disposed at the back faces of the electrodes 61*a*, 61*b*, 61*c*, and 61*d*, respectively.

The electrodes 61*a*, 61*c* lying at one diagonal line in a front face are electrically connected to the electrodes 65*a*, 65*c* lying at corresponding diagonal line in the back face. In a same way, the electrodes 61*b*, 61*d* lying at the other diagonal line in the front face are electrically connected to the electrode 65*b*, 65*d* lying at corresponding diagonal line in the back face. (Hereinafter, to "electrically connect" is merely referred to as "connected".)

The reinforcing plate 63 reinforces the entire vibrating element 6, resulting in preventing the vibrating element 6 from being injured because of over-vibration of the vibrating element 6, external force and so on. Material to constitute the reinforcing plate 63 is not especially limited. However, the material is preferably a kind of metal material such as stainless steel, Aluminum or Aluminum alloy, Titan or Titan alloy, and Copper or Copper system alloy.

It is preferable that the reinforcing plate 63 is thinner (smaller) than the piezoelectric element 62 or 64. As a result, the vibrating element 6 can undergo vibration with high efficiency.

The reinforcing plate 63 further functions as a common electrode for the piezoelectric elements 62, 64. Namely, an AC voltage is applied to the piezoelectric element 62 using the reinforcing plate 63 and desired electrodes selected from the electrodes 61*a*, 61*b*, 61*c*, and 61*d*. An AC voltage is applied to the piezoelectric element 64 using the reinforcing plate 63 and desired electrodes selected from the electrodes 65*a*, 65*b*, 65*c*, and 65*d*.

The piezoelectric elements 62; 64 repeatedly undergo extension and contraction in their longitudinal directions when an AC voltage is applied to substantially entire portions of the elements 62, 64. Accompanying with this motion, the reinforcing plate 63 also repeatedly undergoes extension and contraction in its longitudinal direction. In other words, if an AC voltage is applied to the substantially entire portions of the piezoelectric elements 62, 64, then the vibrating element 6 undergoes vibration (undergoes vibration in a vertical direction) with minute amplitude in its longitudinal direction (in its long-side direction) and the protruding portion 66 undergoes vibration (especially, reciprocates) in a vertical direction.

The protruding portion (contacting portion) 66 is integrally formed at the right end of the reinforcing plate 63 in FIG. 3.

The protruding portion 66 is disposed at a short side 601 at both a lower portion in FIG. 1 and a center portion in a width direction of the reinforcing plate 63 (in the left-and-right direction in FIG. 1).

Further, an arm portion 68 having elasticity (flexibility) is integrally formed at an upper end portion of the reinforcing plate 63 in FIG. 3.

The arm portion 68 is disposed at a long side 602 of the right side and a substantially central portion in the longitudinal direction of the reinforcing plate 63 (i.e., in the upper-and-lower direction in FIG. 1) so as to project in a direction substantially orthogonal to the longitudinal direction of the plate 63. A holding portion 680 is integrally formed at a tip portion of the arm portion 68. An opening 681 into which a bolt 13 is inserted is formed at the holding portion 680.

The vibrating element 6 is fixed to the base 41 by means of the holding portion 680. Namely, the opening 681 at the holding portion 680 is overlapped over a thread opening 410 provided at the base 41. The bolt 13 is inserted into and through the opening 681, and thereby being threaded and fastened to the thread opening 410. And, the bolt 13 is supported using the arm portion 68. Thereby, the vibrating element 6 freely undergoes vibration with relatively greater amplitude.

Further, the vibrating element 6 is biased downward by elastic force (force of restitution) of the arm portion 68. A protruding portion 66 of the vibrating element 6 is pushed onto an outer circumferential surface (abutting portion) 511 of the rotor 51 by the elastic force.

While the protruding portion 66 is abutting on the rotor 51, a power is applied to the electrodes 61*a*, 61*c*, 65*a*, and 65*c* that are located at diagonal lines of the vibrating element 6. When an AC voltage is applied between the reinforcing plate 63 and each of these electrodes 61*a*, 61*c*, 65*a*, and 65*c*, as shown in FIG. 4, portions corresponding to the electrodes 61*a*, 61*c*, 65*a*, and 65*c* respectively repeatedly undergo extension and contraction in a direction represented by arrows a. Therefore, the protruding portion 66 of the vibrating element 6 is displaced, i.e., undergoes vibration (reciprocates) in a slanting direction represented by an arrow b, or the portion 66 is displaced along a substantially elliptic shape, i.e., vibrates (moves) in an elliptical manner as represented by an arrow c. The rotor 51 receives frictional force (or pushing force) from the protruding portion 66 when portions corresponding to the electrodes 61*a*, 61*c*, 65*a*, and 65*c* of the vibrating element 6 undergo extension.

In other words, great frictional force is provided between the protruding portion 66 and the outer circumferential surface 511 by a component S1 corresponding to the radial direction of an vibrating displacement S of the protruding portion 66 (displacement in a radial direction of the rotor 51), and further turning force generated counterclockwise in FIG. 4 is provided to the rotor 51 by a component S2 corresponding to circumferential direction of the vibrating displacement S (displacement in a circumferential direction of the rotor 51).

When the vibrating element 6 undergoes vibration, the force repeatedly operates on the rotor 51, thereby rotating the rotor 51 counterclockwise in FIG. 4.

Then, the electrodes 61b, 61d, 65b, and 65d located at the diagonal lines of the vibrating element 6, to which a power is not applied, are used as a vibration detecting means for detecting vibration of the vibrating element 6.

On the contrary to the above-mentioned mode, as shown in FIG. 5, when a power is applied to the electrodes 61b, 61d, 65b, and 65d that are located at diagonal lines of the vibrating element 6 thereby applying an AC voltage between the reinforcing plate 63 and each of these electrodes 61b, 61d, 65b, and 65d, portions corresponding to the electrodes 61b, 61d, 65b, and 65d respectively repeatedly undergo extension and contraction in a direction represented by arrows a. Therefore, the protruding portion 66 of the vibrating element 6 is displaced, i.e., undergoes vibration reciprocates) in a slanting direction represented by an arrow b or displaced along a substantially elliptical shape as represented by an arrow c, i.e., vibrates (moved) in an elliptical manner. The rotor 51 receives frictional force (pushing force) from the protruding portion 66 when portions corresponding to the electrodes 61b, 61d, 65b, and 65d of the vibrating element 6 undergo extension.

In other words, great frictional force is provided between the protruding portion 66 and the outer circumferential surface 511 by a radial component S1 of the vibrating displacement S of the protruding portion 66 (i.e., displacement in a radial direction of the rotor 51), and further turning force generated clockwise in FIG. 5 is provided to the rotor 51 by a circumferential component S2 of the vibrating displacement S (displacement in a circumferential direction of the rotor 51).

When the vibrating element 6 undergoes vibration, the force repeatedly operates on the rotor 51, thereby rotating the rotor 51 clockwise in FIG. 5.

Then, the electrodes 61a, 61c, 65a, and 65c located at diagonal lines of the vibrating element 6, to which a power is not applied, are used as a vibration detecting means for detecting vibration of the vibrating element 6.

In this regard, change of the shape in the vibrating element 6 is exaggeratively shown in FIGS. 4 and 5, and the arm portion 68 is not shown therein.

Here, the shape and the size of the vibrating element 6, and the position of the protruding portion 66 on the vibrating element 6 may be properly selected so that a resonance frequency of the bending vibration (vibration in a horizontal direction in FIGS. 4 and 5) is substantially as same as the frequency of the vibration in a vertical direction. Thus, the bending vibration and the vertical vibration of the vibrating element 6 can be carried out simultaneously. Therefore, the protruding portion 66 can be displaced (vibrated in an elliptical manner) along a substantial elliptical shape as represented by the arrow c in FIGS. 4 and 5. Further, as is known conventionally, since the vibrating element 6 is driven with phases of the bending vibration and the vertical vibration being mutually shifted, a ratio of a major axis to a minor axis (a major axis/a minor axis) can be changed.

Frequency of the AC power to be applied to the piezoelectric elements 62, 64 is not especially limited. However, it is preferable that the frequency of the AC power is substantially as same as the resonance frequency of vibration (vertical vibration) of the vibrating element 6. Thereby, the amplitude of the vibrating element 6 becomes greater, resulting in allowing the displacing body 2 to be driven with high efficiency.

The driving force of the vibrating element 6 is stronger than that of an ordinal motor that is driven by magnetic force, because the rotor 51 is driven by the above-mentioned frictional force (pushing force). Therefore, the displacing body 2 can be driven with sufficient force without any variable speed mechanism (decelerating mechanism).

Further, any decelerating mechanism is not additionally required (therefore, there is no energy loss in a decelerating mechanism). Since vibration in a plane of the vibrating element 6 is directly converted to rotary motion of the rotor 51, there is less energy loss caused by this conversion. Thus, the displacing body 2 can be driven with high efficiency.

Furthermore, since the rotor 51 can be directly driven (rotated) using the vibrating element 6, any decelerating mechanism is not additionally required. Therefore, it is especially advantageous to allow the entire device to be lighter and smaller (thinner in thickness). Moreover, the configuration of the device can be extremely simplified and easily manufactured, thereby allowing its manufacturing cost to be reduced.

Next, a conducting circuit 20 will be described.

As shown in FIG. 6, the conducting circuit 20 has a switch 9; and a drive circuit 8 provided with an oscillating circuit 81, an amplification circuit 82, and a rotating amount control circuit 83.

The switch 9 is a switching means for switching between conducting electrodes and electrodes to be used as vibration detecting means. When the switch 9 is switched, a rotating direction of the rotor 51 can be changed.

The switch 9 has two switching sections 91, 92 that are cooperative together. The electrode 61d of the vibrating element 6 is connected to a terminal 97 of the switching section 91. The electrode 61a is connected to a terminal 98 of the switching section 92.

A terminal 93 of the switching section 91 and a terminal 96 of the switching section 92, each is connected to an output side of the amplification circuit 82 of the drive circuit 8. An AC power is applied from the amplification circuit 82 to each of the terminals 93, 96.

Further, the reinforcing plate 63 of the vibrating element 6 is connected to ground.

A terminal 94 of the switching section 91 and a terminal 95 of the switching section 92, each is connected to an input side of the oscillating circuit 81 of the drive circuit 8.

Next, an operation of the rotation/displacement converting actuator 1 will be described with reference to FIG. 6.

In a state where the power switch is ON, when instructions are given regarding the rotating direction and the rotating amount (e.g., rotation number and rotation angle) of the rotor 51, the switch 9 is ON and the rotating amount control circuit 83 of the drive circuit 8 is activated based on the given instructions.

In a case of the instructions that the rotor 51 is rotated counterclockwise (in a forward direction) in FIG. 6, the switch 9 is switched so that the terminal 94 and the terminal 97 of the switch 9 are connected, and that the terminal 96 is connected to the terminal 98. Thereby, the output side of the amplification circuit 82 of the drive circuit 8 is conducted to the electrodes 61a, 61c, 65a, and 65c of the vibrating element 6, while the electrodes 61b, 61d, 65b, and 65d of the vibrating element 6, are conducted to the input side of the oscillating circuit 81 of the drive circuit 8.

The oscillating circuit 81 and the amplification circuit 82 of the drive circuit 8, each is controlled using the rotating amount control circuit 83.

An AC voltage to be outputted from the oscillating circuit 81 is amplified using the amplification circuit 82 and thereafter the amplified AC voltage is applied between the reinforcing plate 63 and each of the electrodes 61a, 61c, 65a, and 65c. Thereby, as mentioned above, portions corresponding to the electrodes 61a, 61c, 65a, and 65c, each undergoes extension and contraction repeatedly, the protruding portion 66 of the vibrating element 6 undergoes vibration (i.e., reciprocates) in the slanting direction as represented by the arrow b in FIG. 4, or vibrates (moves) in an elliptical manner as represented by the arrow c in FIG. 4. When the portions corresponding to the electrodes 61a, 61c, 65a, and 65c of the vibrating element 6, each is extended, the rotor 51 receives frictional force (i.e., pushing force) from the protruding portion 66. The rotor 51 is rotated counterclockwise (in the forward direction) in FIG. 1 by means of the frictional force.

Further, the rotor 52 is rotated together with the rotor 51 counterclockwise in FIG. 1. The roller 22 is rolled along the cam surface 521, thereby the displacing body 2 reciprocating in its longitudinal direction.

Then, the electrodes 61b, 61d, 65b, and 65d to which a power is not applied (that are not activated), each serves as a detecting electrode that is used for detecting a voltage to be induced between the reinforcing plate 63 and each of the electrodes 61b, 61d, 65b, and 65d (i.e., induced voltage).

The detected induced voltage (i.e., detected voltage) is inputted to the oscillating circuit 81 that outputs an alternating (AC) voltage having such a frequency (resonance frequency) at which amplitude of the vibrating element 6 becomes maximum, i.e., the detected voltage becomes maximum based on the detected voltage. Thereby, the displacing body 2 can be displaced efficiently.

Further, the rotating amount control circuit 83 controls operation for applying a power to each of those electrodes based on a rotating amount (target value) of the rotor 51, which has received the given instructions.

In other words, the rotating amount control circuit 83 allows the oscillating circuit 81 and the amplification circuit 82 to activate until the rotating amount of the rotor 51 reaches the instructed rotating amount (target value), thereby driving the vibrating element 6 and rotating the rotor 51.

On the contrary thereto, in a case of the instructions that the rotor 51 is rotate clockwise (in a reverse direction opposite to the forward direction) in FIG. 6, as shown in FIG. 6, the switch 9 is switched so that the terminal 93 and the terminal 97 of the switch 9 are connected, and that the terminal 95 is connected to the terminal 98. Thereby, the output side of the amplification circuit 82 of the drive circuit 8 is conducted to the electrodes 61b, 61d, 65b, and 65d of the vibrating element 6, while the electrodes 61a, 61c, 65a, and 65c of the vibrating element 6 are conducted to the input side of the oscillating circuit 81 of the drive circuit 8. Explanation of following operations will be omitted, because the following operations are as same as the operations in a case of the instructions are given which allows the displacing body 2 to rotate counterclockwise (in the forward direction) as shown in FIG. 6.

The rotation/displacement converting actuator 1 in the first embodiment has an advantage that the rotation/displacement converting actuator 1 can be miniaturized (thinner). Additionally, the actuator 1 has an advantage that the actuator 1 does not provide any influence on peripheral equipments of the actuator 1, because an ordinal motor is not used to displace the displacing body 2. Thus, there is no or very little electromagnetic noise generated by such an ordinal motor.

The actuator 1 in the first embodiment can allow the displacing body 2 to be smoothly and surely displaced, and can allow the displacing body 2 to be more accurately (or precisely) displaced in comparison with an actuator in which a solenoid is used. Further, and the actuator 1 can freely obtain moving amount.

When the displacing body 2 is not driven (i.e., in a state where the displacing body 2 is suspended) i.e., when a power is not applied to any of the above-mentioned electrodes, the protruding portion 66 abuts on (is pressed to) the rotor 51. Thus, the displacing body 2 can be maintained in a suspended state by frictional force between the protruding portion 66 and the rotor 51. In other words, according thereto, it can prevent the displacing body 2 from being displaced, and the displacing body 2 can be maintained at a desired position.

Further, since the rotor 51 can be alternatively rotated in the forward and reverse directions, a reversible motion can be established using the rotor 51.

Further, since the vibrating element 6 that is formed by a single body allows the displacing body 2 to be reciprocated i.e., displaced in both directions, in comparison with a case that two dedicated vibrating elements by each of the moving directions are provided, a number of parts of the actuator 1 can be reduced, and the entire device is easy to fabricate, and it is advantageous to allow the entire rotation/displacement converting actuator 1 to be smaller and lighter.

In the present invention, a number of portions where the vibrating element 6 abuts on the displacing body 2, i.e., a number of the protruding portions 66 may be two or more in the vibrating element 6.

Further, in this invention the rotor 51 may be adapted to rotate in an only single direction. Even in this case, the displacing body 2 can reciprocate, i.e., be displaced in both directions using the single vibrating element 6.

Further, not only in the present embodiment (the first embodiment) but also as below-mentioned, in the second embodiment shown in FIG. 8, in the third embodiment shown in FIG. 9, in the fourth embodiment shown in FIG. 11, in the sixth embodiment shown in FIG. 15, in the seventh embodiment shown in FIG. 16, the displacing body 2 can reciprocate even in a single rotating direction of the rotor 51. As a result, there is no necessity to switch an electrical drive direction, thereby simplifying the drive method (i.e., drive control) and efficiently driving-the displacing body 2.

Next, the second embodiment of the rotation/displacement converting actuator according to the present invention will be described.

Figure 7:
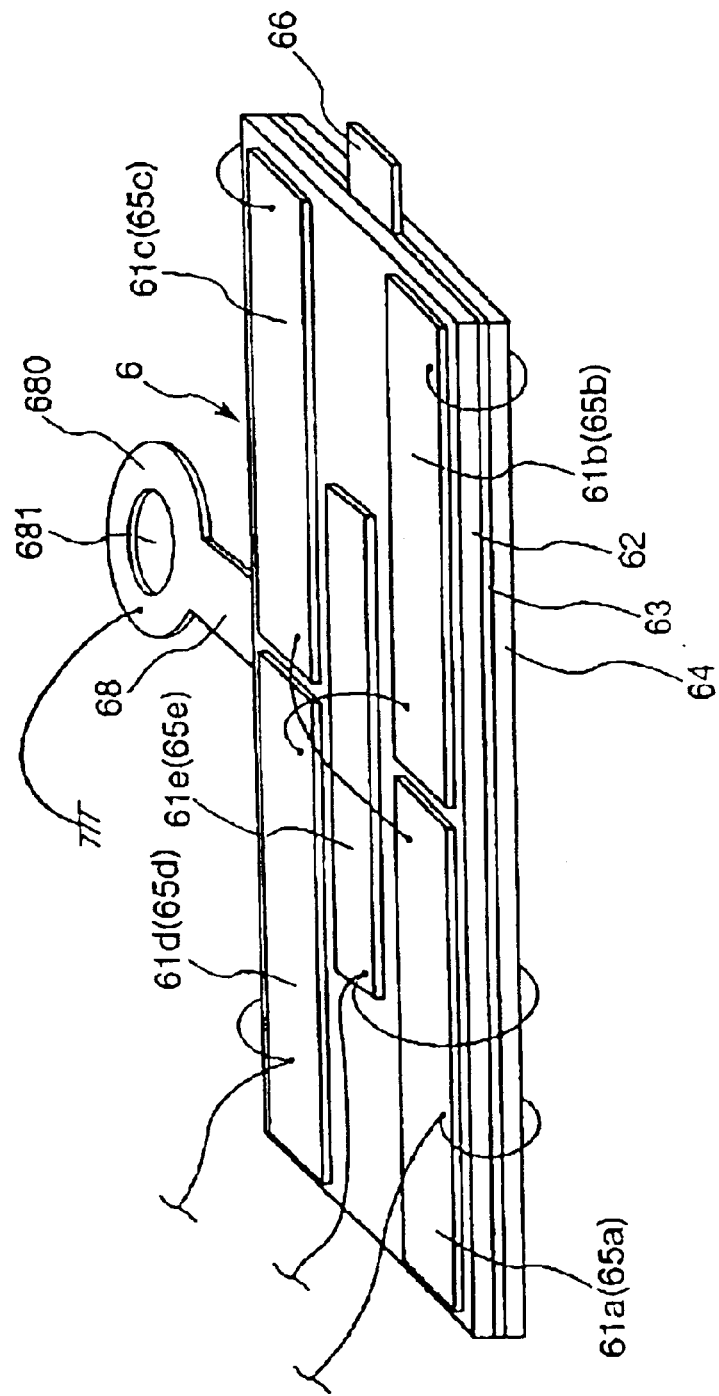
FIG. 7 is a perspective view of the vibrating element in the second embodiment of the rotation/displacement converting actuator according to the present invention.

FIG. 7 is a perspective view of a vibrating element in the second embodiment of a rotation/displacement converting actuator. FIG. 8 is a block diagram showing a circuit configuration in the second embodiment of the rotation/displacement converting actuator.

Here, a rotation/displacement actuator 1 in the second embodiment will be described, focusing on different points between the above-mentioned first embodiment and the second embodiment. In this regard explanation of items including the same matters and the like is omitted.

The rotation/displacement converting actuator 1 in the second embodiment has a first mode in which a rotor 51 i.e., a displacing body 2 is maintained in a suspended state; a second mode in which the rotor 51 can be rotated (the rotor 51 lies in a free state), i.e., the displacing body 2 can be displaced (the displacing body 2 lies in a free state); a third mode in which the rotor 51 is rotated in a forward direction;

and a fourth mode in which the rotor 51 is rotated in the reverse direction. The actuator 1 is adapted to select one of the first, second, third, and fourth modes by selecting any of conducting patterns to each of electrodes to change a vibrating pattern of a vibrating element 6. Hereinafter, more specific explanations will be given as follows.

As shown in FIG. 7, five plate-shaped electrodes 61a, 61b, 61c, 61d, and 61e are disposed at the upper side of a piezoelectric element 62 in FIG. 7, while five plate-shaped electrodes 65a, 65b, 65c, 65d, and 65e are disposed at the lower side of a piezoelectric element 64 in FIG. 7. (The electrodes 65a, 65b, 65c, 65d, and 65e are not shown in FIG. 7, but reference numbers of these electrodes are merely designated using parentheses.)

In other words, the piezoelectric element 62 is substantially equally divided (partitioned) into four rectangular areas. Further, rectangular electrodes 61a, 61b, 61c, and 61d are respectively provided at the divided areas. Likewise, the piezoelectric element 64 is substantially equally divided (partitioned) into four rectangular areas. Further, rectangular electrodes 65a, 65b, 65c, and 65d are respectively provided at the divided areas.

Further, the rectangular electrode 61e is disposed at the middle of the piezoelectric element 62, while the rectangular electrode 65e is disposed at the middle of the piezoelectric element 64. The longitudinal direction of each of the electrodes 61e, 65e substantially corresponds with that (the long side direction) of the vibrating element 6. The electrodes 61e and 65c are detecting electrodes that are used for detecting a voltage to be induced between a reinforcing plate 63 and each of electrodes 61e, 65e, i.e., a voltage to be induced (an induced voltage) in response to a component in a longitudinal direction of the vibration of the vibrating element 6 (i.e., a component of vertical vibration). Further, the electrodes 61e, 65e are respectively used at the second mode.

In this case, the electrodes 65a, 65b, 65c, 65d, and 65e are disposed at the back faces of the electrodes 61a, 61b, 61c, 61d, and 61e, respectively.

The electrodes 61a, 61c lying at one diagonal line are electrically connected (hereinafter merely referred to as "connected") to the electrodes 65a, 65c located at the backside of the electrodes 61a, 61c. Likewise, the electrodes 61b, 61d lying at the other diagonal line are electrically connected to the electrodes 65b, 65d located at the backside of the electrodes 61b, 61d. Further likewise, the electrode 61e at the center is electrically connected (merely referred to as "connected") to the electrode 65e located at the backside of the electrode 61e.

Figure 8:
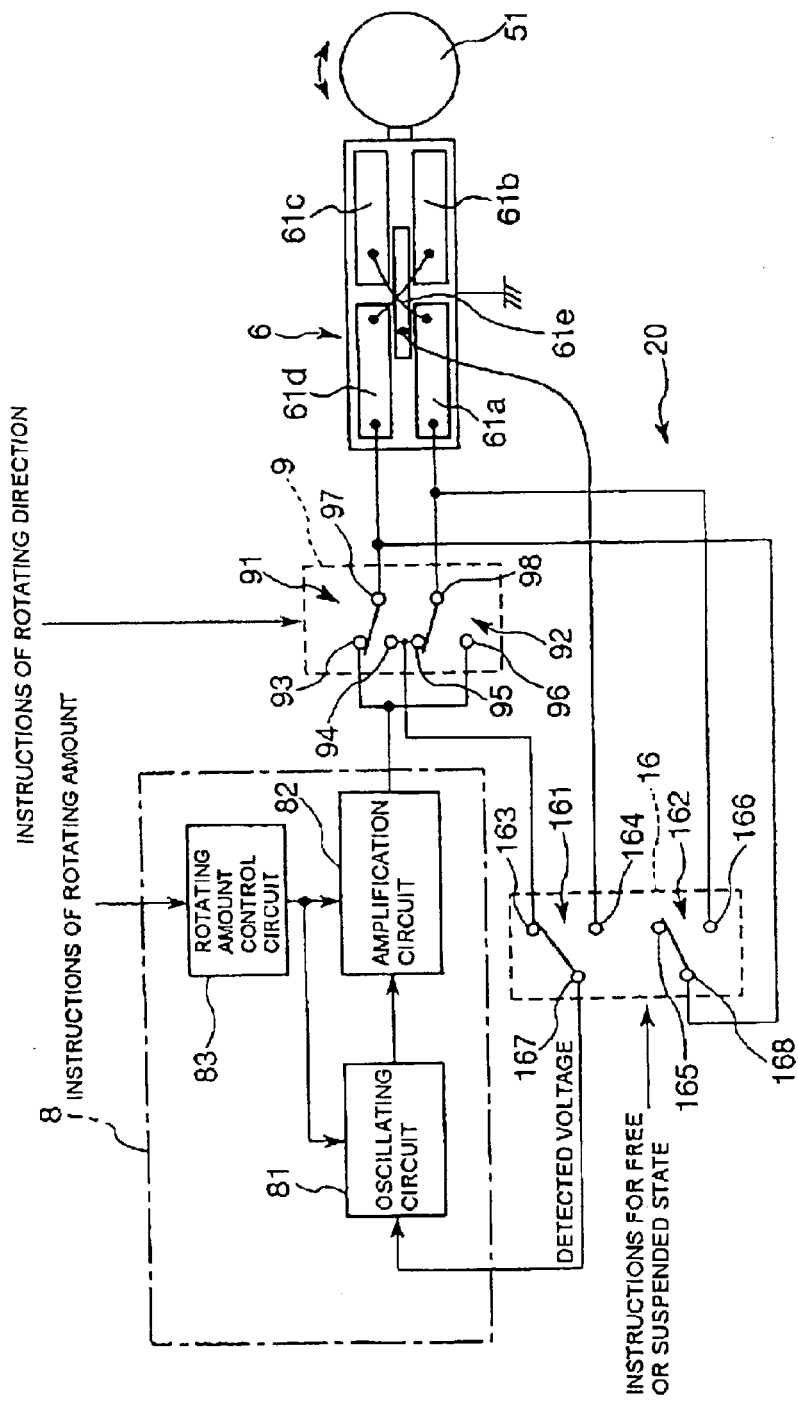
FIG. 8 is a block diagram showing a circuit configuration in the second embodiment of the rotation/displacement converting actuator.

As shown in FIG. 8, a conducting circuit 20 of the rotation/displacement converting actuator 1 in the second embodiment has a drive circuit 8 provided with an oscillating circuit 81, an amplification circuit 82, and a rotating amount control circuit 83; a switch 9; and a switch 16.

The switch 9 is a switching means for switching between electrodes to which a power is applied and electrodes to be used as a vibration detecting means. The rotating direction of the rotor 51 is switched using the switch 9.

The switch 9 has two switching sections 91, 92 that are cooperative together. The electrode 61d of the vibrating element 6 is connected to a terminal 97 of the switching section 91, while the electrode 61a thereof is connected to a terminal 98 of the switching section 92.

A terminal 93 of the switching section 91 and a terminal 96 of the switching section 92, each is connected to an output side of the amplification circuit 82 of the drive circuit 8, so that corresponding AC voltages are applied to each of the terminal 93, 96 from the amplification circuit 82.

Further, the reinforcing plate 63 of the vibrating element 6 is connected to ground.

Furthermore, a terminal 94 of the switching section 91 and a terminal 95 of the switching section 92, each is connected to an input side of the oscillating circuit 81 of the drive circuit 8.

The switch 16 has two switching sections 161, 162 that are cooperative.

A terminal 163 of the switching section 161 is connected to terminals 94, 95 of the switch 9, while a terminal 164 thereof is connected to the electrode 61e of the vibrating element 6.

Further, a terminal 167 of the switching section 161 is connected to the input side of the oscillating circuit 81 of the drive circuit 8.

Further, a terminal 166 of the switching section 162 is connected to the terminal 98 of the switch 9 and the electrode 61a of the vibrating element 6, while a terminal 168 thereof is connected to the terminal 97 of the switch 9 and the electrode 61d of the vibrating element 6.

In this case, explanation about the drive circuit 8 will be omitted, because the function thereof is as same as that in the first embodiment.

Next, each of the above-mentioned modes will be described.

In the first mode, there does not occur excitation with relative to the vibrating element 6. In other words, a power is not applied to any of the above-mentioned electrodes. In this case, since the protruding portion 66 of the vibrating element 6 abuts on (is pressed to) the rotor 51, and the rotor 51 is maintained in a suspended state by frictional force between the protruding portion 66 and the rotor 51, then the displacing body 2 can be maintained in a suspended state. Namely, it can prevent the displacing body 2 from being moved, the displacing body 2 can be maintained at a desired position.

In the second mode, vibration is excited in a direction substantially orthogonal to a tangent line at a portion where the circumferential surface 511 of the rotor 51 abuts on the protruding portion 66. In other words, a power is supplied to the electrodes 61a, 61b, 61c, 61d, 65a, 65b, 65c, and 65d at both diagonal lines of the vibrating element 6. An AC voltage is applied between the reinforcing plate 63 and each of the electrodes 61a, 61b, 61c, 61d, 65a, 65b, 65c, and 65d. Thereby, the vibrating element 6 repeatedly undergoes extension and contraction in its longitudinal direction (in its long side direction) i.e., vibrates (vertically vibrates) with minute amplitude in its longitudinal direction. In other words, the protruding portion 66 of the vibrating element 6 undergoes vibration (reciprocates) in its longitudinal direction (in its long side direction).

When the vibrating element 6 undergoes contraction, the rotor 51 is away from the protruding portion 66 so that frictional force between the rotor 51 and the protruding portion 66 disappears or decreased, and so that the rotor 51 is in a free state. Thus, the rotor 51 can be freely rotated both counterclockwise and clockwise. Thereby, the displacing body 2 can be freely displaced. On the other hand, when the vibrating element 6 undergoes extension, the rotor 51 receives pushing force from the protruding portion 66. Because its direction is substantially orthogonal to the tangent line, the rotor 51 is rotated neither counterclockwise nor clockwise and the displacing body 2 is not displaced.

Thus, the rotor 51 i.e., the displacing body 2 lies in a free state by vibration of the vibrating element 6 and can be displaced in both directions.

In the third mode, vibration is excited, which at least has a displacing component of vibration in the forward rotating direction of the rotor 51 (the circumferential direction component S2 shown in FIG. 4). In other word, a power is supplied to the electrodes 61a, 61c, 65a, and 65c that are located at the diagonal lines of the vibrating element 6. An AC voltage is applied to the reinforcing plate 63 and each of the electrodes 61a, 61c, 65a, and 65c. Thereby, as mentioned in the first embodiment, the rotor 51 is rotated counterclockwise (in the forward direction) in FIG. 8. Then, the electrodes 61b, 61d, 65b, and 65d that are located at the diagonal lines of the vibrating element 6, to which a power is not applied, is used as a vibration detecting means for detecting vibration of the vibrating element 6.

In the fourth mode, vibration is excited, which at least has a displacing component of vibration in the forward rotating direction of the rotor 51 (the circumferential direction component S2 shown in FIG. 5). In other word, a power is supplied to the electrodes 61b, 61d, 65b, and 65d that are located at the diagonal lines of the vibrating element 6. An AC voltage is applied to the reinforcing plate 63 and each of the electrodes 61b, 61d, 65b, and 65d. Thereby, as mentioned in the first embodiment, the rotor 51 is rotated clockwise (in the reverse direction) in FIG. 8. Then, the electrodes 61a, 61c, 65a, and 65c that are located on the diagonal lines of the vibrating element 6, to which a power is not applied, is used as a vibration detecting means for detecting vibration of the vibrating element 6.

Next, the operation of the rotation/displacement converting actuator 1 will be explained, with reference to FIG. 8.

In a state where the power switch is ON, when instructions for suspended/freeing the rotor 51(displacing body 2) and instructions for a rotating direction and a rotating amount (rotation number and rotation angle) of the rotor 51 are given, the switch 9, the switch 16, and the rotating amount control circuit 83 of the drive circuit 8 are operated based on such instructions. Namely, any one of the first mode, the second mode, the third mode, and the fourth mode described above is established.

In the case (of the third mode) where instructions indicate that the rotor 51 is to be rotated counterclockwise (in the forward direction) in FIG. 8, the switch 16 is switched so that the terminal 163 and the terminal 167 of the switch 16 are connected, and the terminal 165 and the terminal 168 of the switch 16 are connected, while the switch 9 is switched so that the terminal 94 and the terminal 97 are connected, and the terminal 96 and the terminal 98 are connected. Thus, the output side of the amplification circuit 82 of the drive circuit 8 is conducted to the electrodes 61a, 61c, 65a, and 65c of the vibrating element 6, and the input side of the oscillating circuit 81 of the drive circuit 8 is conducted to the electrodes 61b, 61d, 65b, and 65d of the vibrating element 6.

The oscillating circuit 81 and the amplification circuit 82 of the drive circuit 8 are controlled by the rotating amount control circuit 83.

An AC voltage outputted from the oscillating circuit 81 is amplified by the amplification circuit 82 and then applied between the reinforcing plate 63 and each of the electrodes 61a, 61c, 65a, and 65c. Thus, as mentioned above, the portions corresponding to the electrodes 61a, 61c, 65a, and 65c of the vibrating element 6, each undergoes expansion and contraction repeatedly, and the protruding portion 66 of the vibrating element 6 undergoes vibration (reciprocates) in a slanting direction as represented by the arrow b in FIG. 4, and vibrates (moves) in an elliptical manner as represented by the arrow c. The rotor 51 receives the frictional force (pushing force) from the protruding portion 66 when the portions corresponding to the electrodes 61a, 61c, 65a, and 65c of the vibrating element 6 are extended, and this repeating frictional force (pushing force) moves (rotates) the rotor 51 counterclockwise (in the forward direction) in FIG. 1.

Further, the rotor 52 is rotated counterclockwise in FIG. 1 (in the forward direction) together with the rotor 51. The roller 22 is rolled along the cam surface 521. Thus, the displacing body 2 reciprocates in its longitudinal direction.

Then, the electrodes 61a, 61c, 65a, and 65c to which a power is not applied (not activated) serve as detecting electrodes that are used to detect a voltage to be induced between the reinforcing plate 63 and each of the electrodes 61a, 61c, 65a, and 65c (induced voltage).

The detected induced voltage (detected voltage) is inputted to the oscillating circuit 81, and then based on such detected voltage, the oscillating circuit 81 outputs an AC voltage having a frequency (resonance frequency) at which amplitude of the vibrating element 6 becomes maximum, namely, the detected voltage becomes maximum. Thus, the displacing body 2 can be displaced efficiently.

Further, the rotating amount control circuit 83 controls operation for applying a power to each of those electrodes based on the indicated rotating amount (target value) of the rotor 51.

Namely, the rotating amount control circuit 83 allows the oscillating circuit 81 and the amplification circuit 82 to activate until the rotating amount of the rotor 51 reaches the indicated rotating amount (target value) of the rotor 51, thereby driving the vibrating element 6 and rotating the rotor 51.

On the contrary thereto, in the case (of the fourth mode) where the instructions indicate that the rotor 51 is to be rotated clockwise (in the reverse direction) in FIG. 8, as shown in FIG. 8, the switch 16 is switched so that the terminal 163 and the terminal 167 of the switch 16 are connected, and the terminal 165 and the terminal 168 of the switch 16 are connected, while the switch 9 is switched so that the terminal 93 and the terminal 97 of the switch 9 are connected, and the terminal 95 and the terminal 98 of the switch 9 are connected. Thus, the output side of the amplification circuit 82 of the drive circuit 8 is conducted to the electrodes 61b, 61d, 65b, and 65d of the vibrating element 6, and the input side of the oscillating circuit 81 of the drive circuit 8 is conducted to the electrodes 61a, 61c, 65a, and 65c of the vibrating element 6. Because the other operations are the same as those of the case where the instructions indicate that the rotor 51 is to be rotated counterclockwise in FIG. 8, a description thereof is omitted.

In the case (of the first mode) where the instructions indicate that the rotor 51, i.e., the displacing body 2 is to be kept in the suspended state, as shown in FIG. 8, the switch 16 is switched so that the terminal 163 and the terminal 167 of the switch 16 are connected, and the terminal 165 and the terminal 168 of the switch 16 are connected.

The rotating amount control circuit 83 does not allow the oscillating circuit 81 and the amplification circuit 82 to activate. Namely, an AC voltage is not applied to any of the electrodes of the vibrating element 6.

The protruding portion 66 is in pushing contact with (abuts on) the rotor 51, and the frictional force between the protruding portion 66 and the rotor 51 keeps the rotor 51 in the suspended state. Thus, the displacing body 2 is kept in a suspended state. Namely, the displacing body 2 is prevented from moving, and the displacing body 2 is maintained at a desired position.

In the case of the first mode, the switches 9 and 16 may be switched in any manner as long as an AC voltage is not applied to any of the electrodes of the vibrating element 6.

In the case (of the second mode) where the instructions indicate that the rotor 51 is to be set in the free state, in other words, the instructions indicate that the displacing body 2 is to be set in the free state, the switch 16 is switched so that the terminal 164 and the terminal 167 of the switch 16 are connected, and the terminal 166 and the terminal 168 of the switch 16 are connected. Thus, the output side of the amplification circuit 82 of the drive circuit 8 is conducted to the electrodes 61a, 61b, 61c, 61d, 65a, 65b, 65c, and 65d of the vibrating element 6, and the electrodes 61e and 65e of the vibrating element 6 are conducted to the input side of the oscillating circuit 81 of the drive circuit 8.

An AC voltage outputted from the oscillating circuit 81 is amplified by the amplification circuit 82 and then applied between the reinforcing plate 63 and each of the electrodes 61a, 61b, 61c, 61d, 65a, 65b, 65c, and 65d. Thus, as mentioned above, the protruding portion 66 of the vibrating element 6 undergoes vibration (reciprocates) in its longitudinal direction, so that a free state is formed which makes it possible to freely displace the displacing body 2 in both directions of the reciprocating movement in FIG. 8.

Then, the voltage (induced voltage) induced between the reinforcing plate 63 and each of the electrodes 61e and 65e is detected from each of the electrodes 61e and 65e. The detected induced voltage (detected voltage) is inputted to the oscillating circuit 81, and thereafter, based on the detected voltage, the oscillating circuit 81 outputs an AC voltage having a frequency at which amplitude of the vertical vibration of the vibrating element 6 becomes maximum, namely, the detected voltage becomes maximum. Thus, the rotor 51 can be rotated, i.e., the displacing body 2 can be displaced more smoothly.

Here, in the second mode, the switch 9 may be switched in any manner.

The rotation/displacement converting actuator 1 of this second embodiment obtains the same results as the above-mentioned first embodiment.

In this rotation/displacement converting actuator 1, there is wide applicability, because it is possible to select any state from the four states, which are a state where the rotor 51 (displacing body 2) is kept in a suspended state, i.e., a state of high friction, a state where the rotor 51 is allowed to be rotated in the forward direction (i.e., the rotor 51 and the displacing body 2 are set in a free state), i.e., a state of low friction, a state where the rotor 51 is rotated in the forward direction, and a state where the rotor 51 is rotated in the reverse direction.

In the above-mentioned vibrating element 6, the case where the electrodes to drive the vibrating element 6 are divided into four sections has been described. However, this is just one example for selectively exciting vertical vibration and bending vibration, and in the present invention, the structure and the driving method of the vibrating element 6 are not limited to the above-mentioned ones.

Additionally, in a configuration of the present invention, the third mode or the fourth mode may be omitted, and the rotor 51 may be rotated in a only one direction. Even in this case, the displacing body 2 can reciprocate i.e., can be displaced in its both directions using the only one vibrating element 6.

Next, a third embodiment of a rotation/displacement converting actuator according to the present invention will be described.

Figure 9:
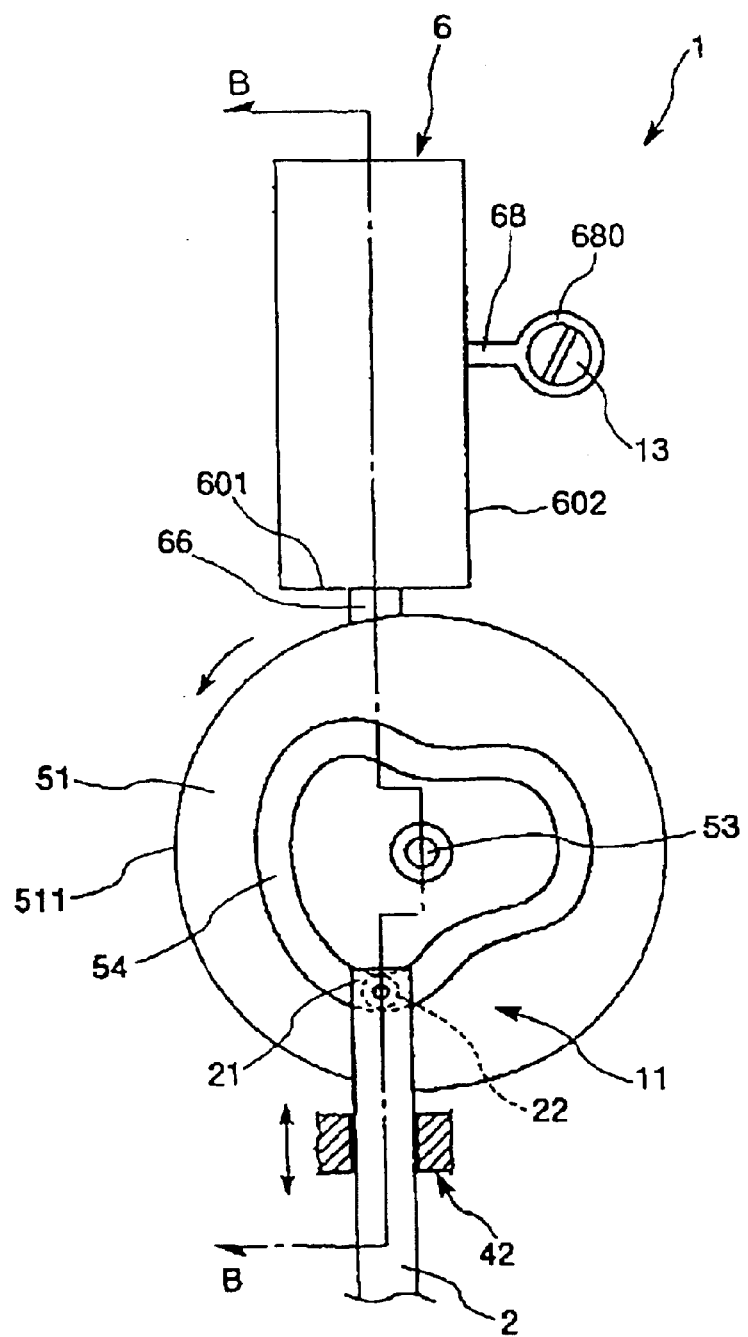
FIG. 9 is a plan view showing a third embodiment of the rotation/displacement converting actuator according to the present invention.
Figure 10:
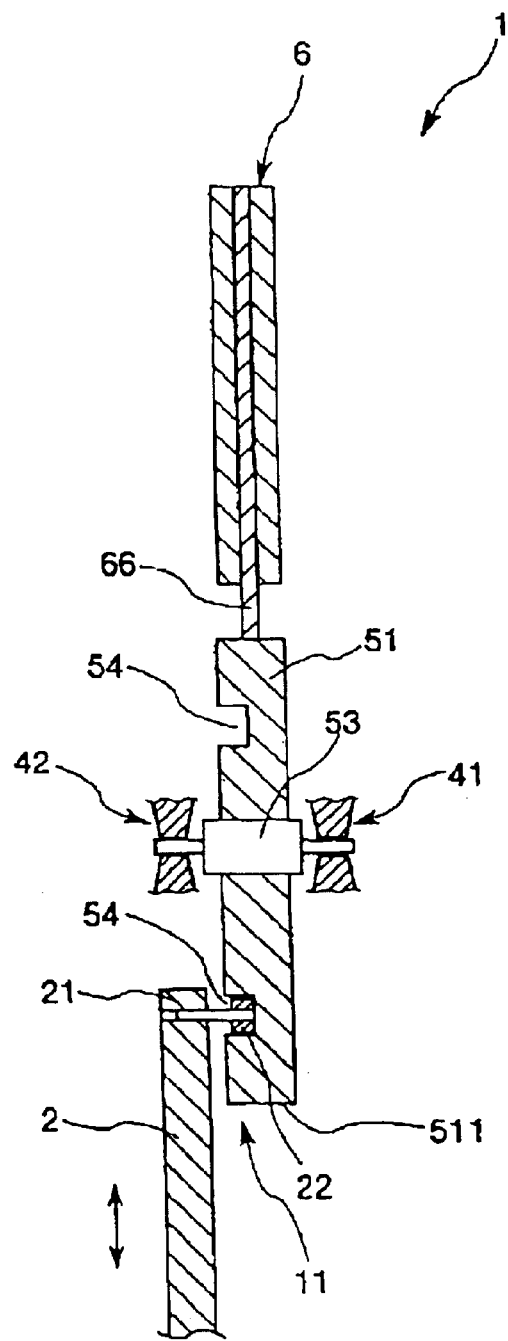
FIG. 10 is a sectional view taken along line B—B of the rotation/displacement converting actuator shown in FIG. 9.

FIG. 9 is a plan view showing the third embodiment of the rotation/displacement converting actuator. FIG. 10 is a sectional view taken along line B—B of the rotation/displacement converting actuator shown in FIG. 9. Here, a base 41 is not shown in FIG. 9, but the base 42 is partially shown in FIG. 9. Further, the base 41 and the base 42 are partially shown in FIG. 10. Now, in following explanations using FIG. 9, an upper side is referred to as "upper", a lower side is referred to as "lower", a right side is referred to as "right", and a left side is referred to as "left".

Here, the rotation/displacement converting actuator 1 of the third embodiment will be described below, focusing on the different points between the first embodiment described above and the third embodiment, and a description of the same items is omitted.

As shown in FIGS. 9 and 10, a cam recess 54 is formed as a cam of the cam mechanism 11 in the rotor 51 of the rotation/displacement converting actuator 1 in the third embodiment.

The cam recess 54 is formed at a lateral face at the left side of the rotor 51 in FIG. 10. The cam surface is constituted by both lateral faces in the cam recess 54. Therefore, the cam recess 54 i.e., the cam surface and a portion where a protruding portion 66 of the vibrating element 6 abuts on the rotor 51 (outer circumferential surface 511 of the rotor 51) are located on a substantially same plane. Thus, the rotation/displacement converting actuator 1 can be made in a thinner manner, and eccentricity of shaft (axle) of the rotor 51 can be prevented.

The cam recess 54 is ring-shaped in a desired pattern.

In this regard, in the third embodiment of the present invention, though the cam recess 54 has a bottom, any other manner can be adopted. For example, the cam recess 54 may be penetrated through the rotor 51 in a slit-like manner.

The roller 22 provided at the tip portion 21 of the displacing body 2 is located within the cam recess 54. The roller 22 abuts on both lateral faces (cam surfaces) within the cam recess 54. Alternatively there may be somewhat apace relative to both lateral faces so that rattling does not occur there. In this case, the diameter of the roller 22 is somewhat shorter than the width of the cam recess 54.

When the vibrating element 6 undergoes vibration and the rotor 51 is rotated in a desired direction, the roller 22 is rolled along the cam recess 54. Thus, the displacing body 2 reciprocates in its longitudinal direction.

According to this rotation/displacement converting actuator 1, a same effect can be obtained as the effect of the rotation/displacement converting actuator 1 in the above-mentioned first embodiment.

In the rotation/displacement converting actuator 1, since the cam recess 54 and the outer circumferential surface 511 of the rotor 51 are located at the same plane, the actuator 1 in the second embodiment is thinner than the actuator 1 in the first embodiment.

Since the cam recess 54 constitutes a cam portion, a coil spring (biasing means) 17 employed in the above-mentioned first embodiment is not necessary. Thus, a total number of parts to be used can be reduced and the manufacturing of the actuator 1 can be simplified.

Here, in the present invention, the first mode, the second mode, the third mode, and the fourth mode may be employed in a same way as the above-mentioned second embodiment.

Next, a fourth embodiment of the rotation/displacement converting actuator according to the present invention will be described.

Figure 11:
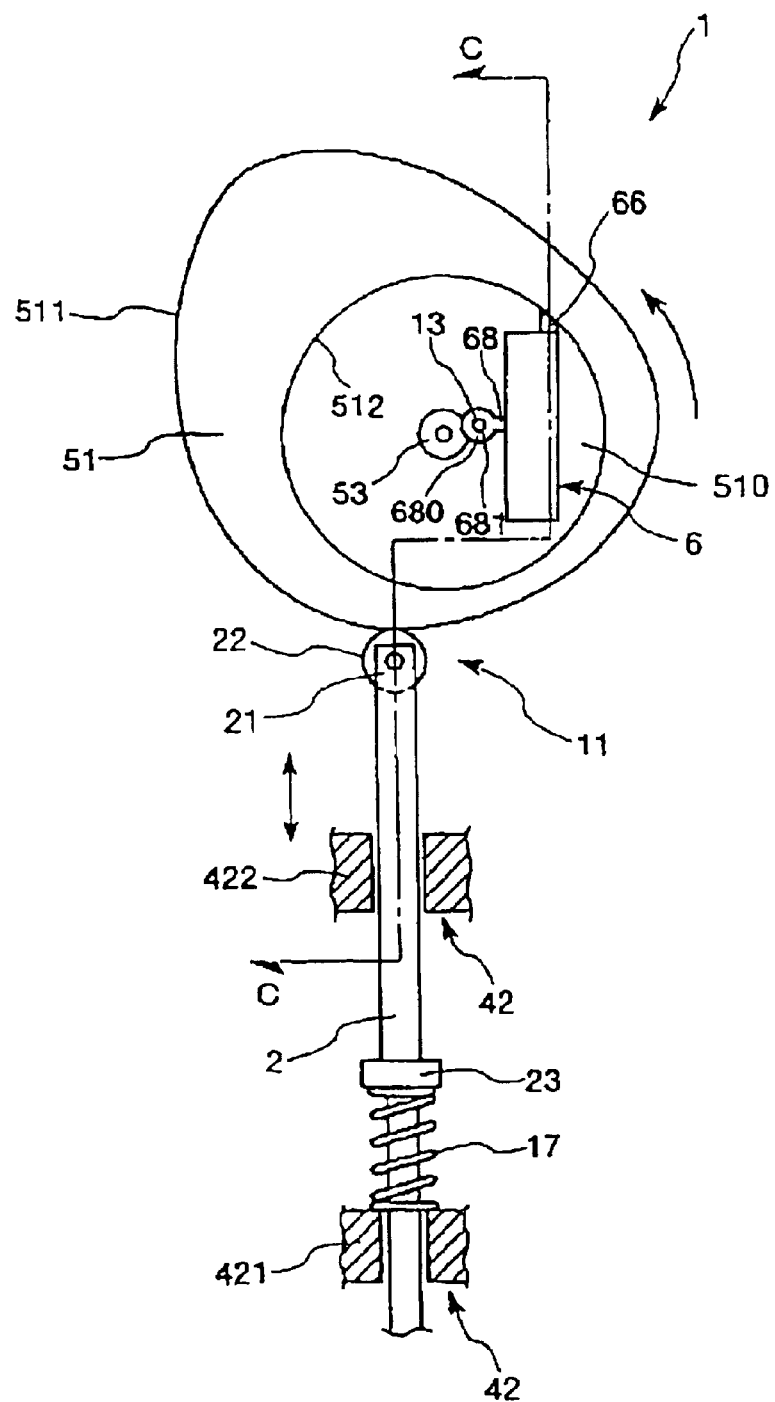
FIG. 11 is a plan view showing a fourth embodiment of the rotational/displacement converting actuator according to the present invention.
Figure 12:
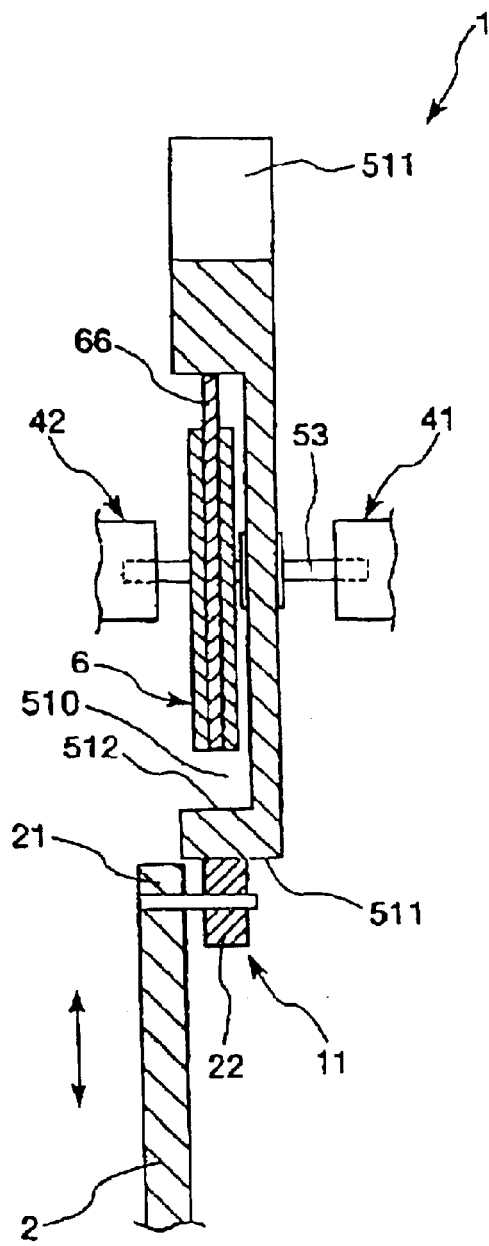
FIG. 12 is a sectional view taken along line C—C of the rotation/displacement converting actuator shown in FIG. 11.

FIG. 11 is a plan view showing the fourth embodiment of the rotation/displacement converting actuator according to the present invention. FIG. 12 is a sectional view taken along line C-C in the rotation/displacement converting actuator shown in FIG. 11. Here, in FIG. 11, the base 41 is not shown, while the base 42 is partially shown, and in FIG. 12, the base 41 and the base 42 are respectively partially shown. In following explanation, an upper side, a lower side, a right side, and a left side in FIG. 11 are respectively referred to as "upper", "lower", "right", and "left".

Here, the rotation/displacement converting actuator 1 of the fourth embodiment will be described below, focusing on the different points between the first embodiment described above and the forth embodiment, and a description of the same items is omitted.

As shown in these drawings, in the rotation/displacement converting actuator 1 in the fourth embodiment, the outer circumferential surface 511 of the rotor 51 constitutes a cam surface of the cam mechanism 11.

A substantially circle-shaped concave portion 510 is formed in the rotor 51 in a plane of FIG. 11. The center of the concave portion 510 corresponds to the center of rotation of the rotor 51.

The vibrating element 6 is located within the concave portion 510 of the rotor 51 and fixed to the base 42 using a bolt 13 at a holding portion 680. The protruding portion 66 abuts on the inner circumferential surface 512 of the rotor 51 from the inside.

In other words, a cam surface (outer circumferential surface 511) of the cam mechanism 11 is located at an outer circumferential side rather than at a portion where the cam surface of the cam mechanism 11 abuts on the protruding portion 66 of the vibrating element of the rotor 51(the inner circumferential surface 512).

The cam surface (outer circumferential surface 511) of the cam mechanism 11 and the portion (inner circumferential surface 512) where the rotor 51 abuts on the protruding portion 66 of the vibrating element 6 are located at the same plane. Thus, the rotation/displacement converting actuator 1 can be thinner, and eccentricity of shaft (axle) of the rotor 51 can be prevented.

When the rotor 51 is rotated in a desired direction by vibration of the vibrating element 6, the roller 22 is rolled along the cam surface (the outer circumferential surface 511) so that the displacing body 2 reciprocates in its longitudinal direction.

According to the rotation/displacement converting actuator 1, a same effect can be obtained as the effect of the rotation/displacement converting actuator 1 of the above-mentioned first embodiment.

In the rotation/displacement converting actuator 1, since the cam surface (the outer circumferential surface 511) and the inner circumferential surface 512 are located at the same plane, the actuator 1 can be thinner than that of the first embodiment.

Here, in the present invention, the first mode, the second mode, the third mode, and the fourth mode may be provided in a same way as the above-mentioned second embodiment.

Additionally, in the present invention, a cam recess forms the cam of the cam mechanism 11.

Next, a fifth embodiment of the rotation/displacement converting actuator in the present invention will be described.

Figure 13:
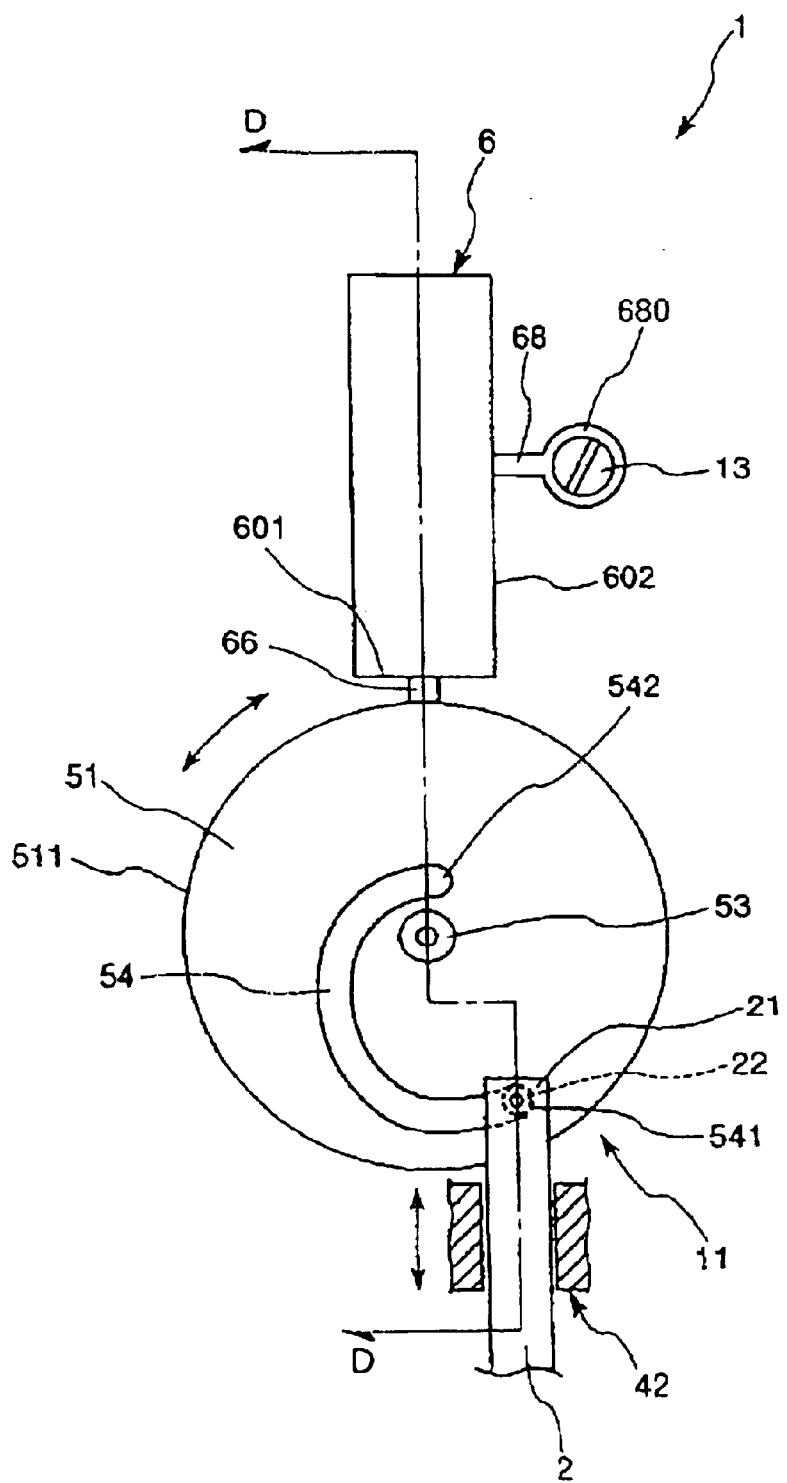
FIG. 13 is a plan view showing a fifth embodiment of the rotation/displacement converting actuator according to the present invention.
Figure 14:
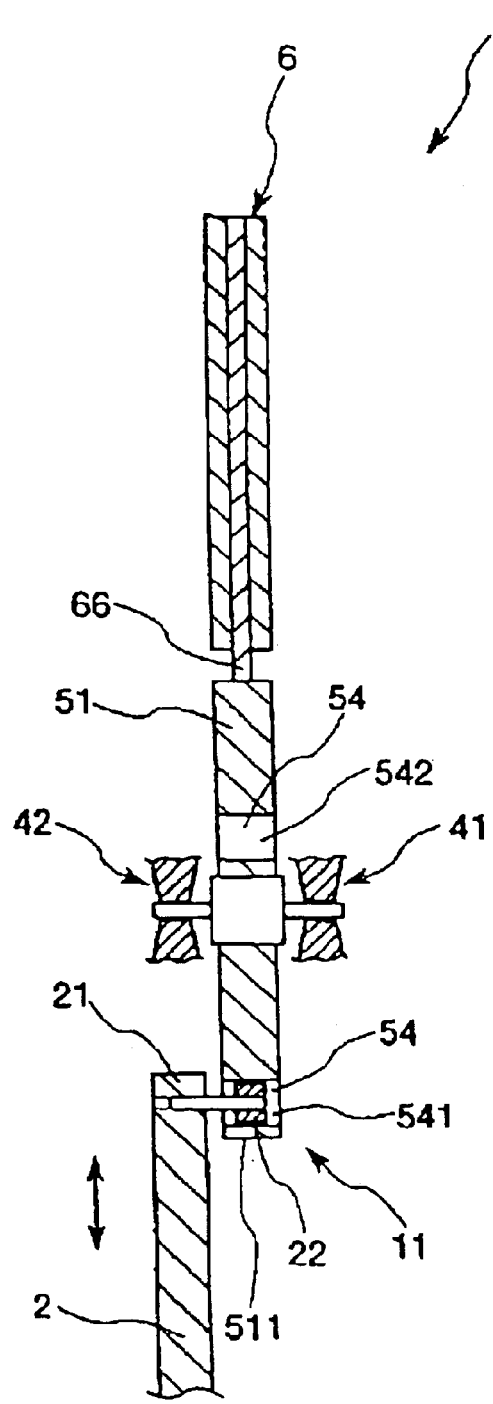
FIG. 14 is a sectional view taken along line D—D of the rotation/displacement actuator shown in FIG. 13.

FIG. 13 is a plan view showing the fifth embodiment of the rotation/displacement converting actuator according to the present invention. FIG. 14 is a sectional view taken along line D—D of the rotation/displacement converting actuator shown in FIG. 13. Here, in FIG. 13, the base 41 is not shown and the base 42 is partially shown, and in FIG. 14, the base 41 and the base 42 are respectively partially shown. In following explanation, an upper side, a lower side, a right side, and a left side are referred as to "upper", "lower", "right", and "left".

Here, a rotation/displacement actuator 1 in the fifth embodiment will be described, focusing on different points between the above-mentioned third embodiment and the fifth embodiment. In this regard, explanation of items including the same matters and the like is omitted.

As shown in FIGS. 13 and 14, in the rotation/displacement converting actuator 1 of the fifth embodiment, one end side of the cam recess 54 of the cam mechanism 11 is not in communication with the other end side thereof. Namely, the one end side 641 of the cam recess 54 is located at an outer circumferential side of the rotor 51, while the other end side 542 thereof is located at an inner circumferential side of the rotor 51.

When the vibrating element 6 undergoes vibration and thereby the rotor 51 is rotated counterclockwise in FIG. 13, the roller 22 is rolled along the cam recess 54, so that the displacing body 2 is displaced upward. Then, when the roller 22 is moved to the end portion 542 of the cam recess 54, the roller 22 is locked at the end portion 542. Thus, it can prevent the rotor 51 from being rotated in the reverse direction in FIG. 13 and further it can prevent the displacing body 2 from being displaced upward. As a result, when the displacing body 2 is displaced upward, the displacing body 2 can be stopped at a desired position.

Likewise, when the vibrating element 6 undergoes vibration and thereby the rotor 51 is rotated clockwise in FIG. 13, the roller 22 is rolled along the cam recess 54, so that the displacing body 2 is displaced downward. Then, when the roller 22 is moved to the end portion 541 of the cam recess 54, the roller 22 is locked at the end portion 541. Thus, it can prevent the rotor 51 from being rotated clockwise in FIG. 13 and further it can prevent the displacing body 2 from being moved downward. As a result, when the displacing body 2 is moved downward, the displacing body 2 can be stopped at a desired position.

Thus, the displacing body 2 can reciprocate in its longitudinal direction, and be surely stopped at a desired position.

Therefore, the cam recess 54 and the roller 22 constitute a displacement restricting means for restricting displacement of the displacing body 2.

According to the rotation/displacement converting actuator 1, a same effect can be obtained as the effect of the rotation/displacement converting actuator 1 of the above-mentioned third embodiment.

The rotation/displacement converting actuator 1 can stop the displacing body 2 at a desired position.

Here, in the present invention, the first mode, the second mode, the third mode, and the fourth mode may be provided in a same way as the above-mentioned second embodiment.

Next, a sixth embodiment of the rotation/displacement converting actuator according to the present invention will be described.

Figure 15:
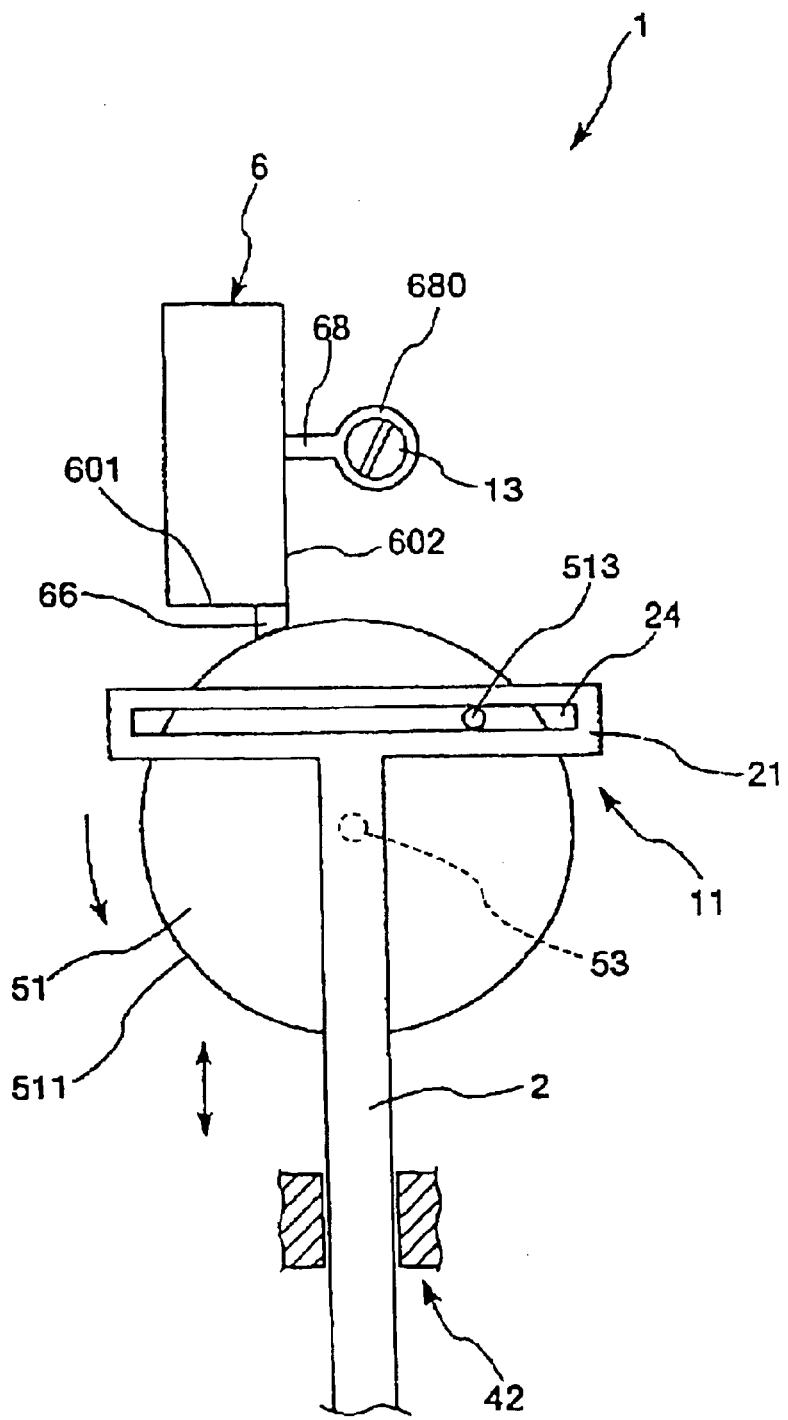
FIG. 15 is a plan view showing a sixth embodiment of the rotation/displacement converting actuator according to the present invention.

FIG. 15 is a plan view showing the sixth embodiment of the rotation/displacement converting actuator according to the present invention. Here, in FIG. 15 the base 41 is not shown, while the base 42 is partially shown. In following explanations using FIG. 15, an upper side, a lower side, a right side, and a left side are referred to as "upper", "lower", "right" and "left".

Here, a rotation/displacement converting actuator 1 in the sixth embodiment will be described, focusing on different points between the above-mentioned third embodiment and the sixth embodiment. In this regard, explanation of items including the same matters and the like is omitted.

As shown in FIG. 15, in the rotation/displacement converting actuator 1, a cam recess 24 is formed as a cam of the cam mechanism 11 at the tip portion 21 of the displacing body 2. The cam recess 24 is substantially linearly formed in a right-and-left direction in FIG. 15.

Here, in the sixth embodiment, the cam recess 24 is slit-shaped. The other shape can be adopted. For example, the cam recess 24 may have a recess having a bottom.

A pin (abutting portion) 513 is projectingly provided at lateral faces of the rotor 51. The pin 513 is disposed at a position away from the rotating center of the rotor 51 in a desired distance. The tip portion of the pin 513 is inserted (positioned) into the cam recess 24, and abuts on both lateral faces (cam surface) in the cam recess 24 or somewhat spaced relative to both lateral faces so that rattling does not occur there.

The pin 513 and the cam recess 24 constitute a main portion of the cam mechanism 11. When the vibrating element 6 undergoes vibration and thereby the rotor 51 is rotated in a desired direction, the pin 513 slides along the cam recess 24. Thus, the displacing body 2 reciprocates in its longitudinal direction.

According to the rotation/displacement converting actuator 1, the same effect can be obtained as the effect of the rotation/displacement converting actuator 1 of the above-mentioned third embodiment.

Here, in the present invention, the first mode, the second mode, the third mode, and the fourth mode may be provided in a same way as the above-mentioned second embodiment.

Further, the displacement restricting means for restricting the displacement of the displacing body 2 may be provided in a same way as the above-mentioned fifth embodiment. In this case, for example, a pattern of the cam recess 24 (e.g., length, position, shape, and the like of the recess) is changed to a desired pattern, so that the displacement of the displacing body 2 can be restricted, and the displacing body 2 can be surely stopped at a desired position.

Next, a seventh embodiment of the rotation/displacement converting actuator according to the present invention will be described.

Figure 16:
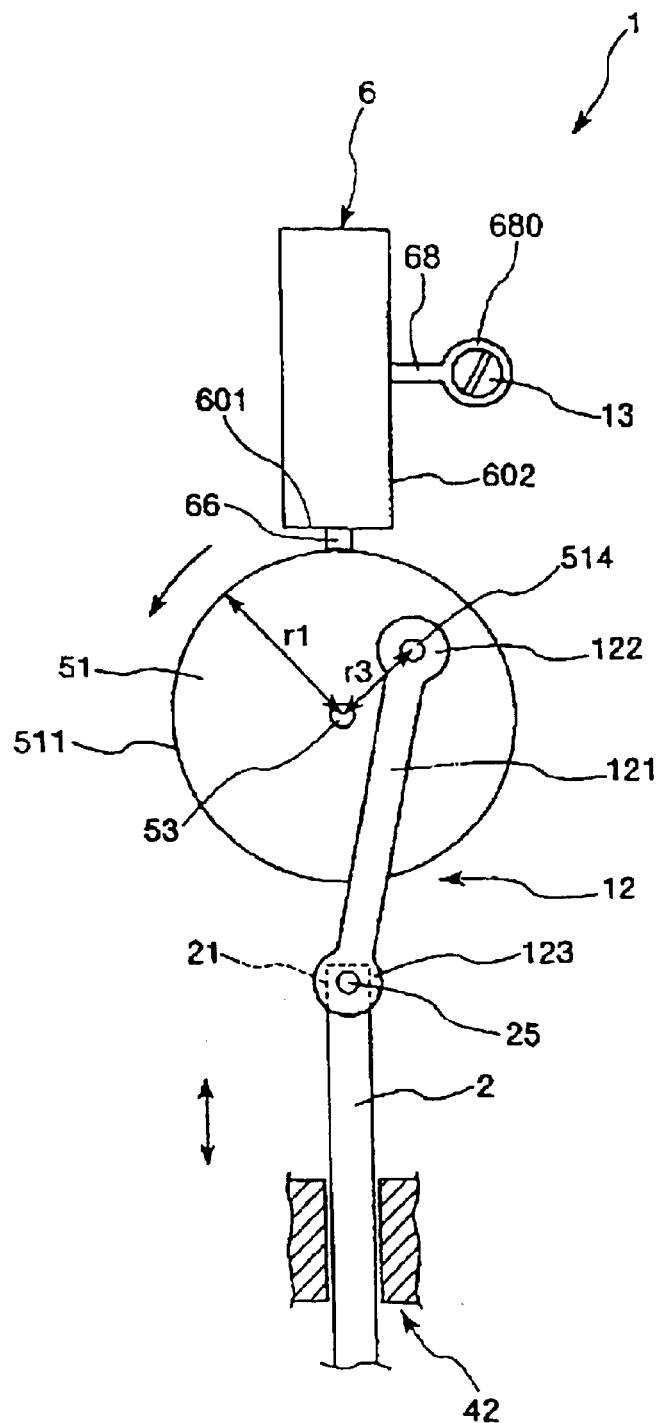
FIG. 16 is a plan view showing a seventh embodiment of the rotation/displacement converting actuator according to the present invention.

FIG. 16 is a plan view showing the seventh embodiment of the rotation/displacement converting actuator according to the present invention. Here, in FIG. 16 the base 41 is not shown, while the base 42 is partially shown. In following explanations using FIG. 16, an upper side, a lower side, a right side, and a left side are referred to as "upper", "lower", "right" and "left".

Here, a rotation/displacement converting actuator 1 in the seventh embodiment will be described, focusing on different points between the above-mentioned sixth embodiment and the seventh embodiment. In this regard, explanation of items including the same matters and the like is omitted.

As shown in FIG. 16, the rotation/displacement converting actuator 1 of the seventh embodiment has a crank mechanism (converting mechanism) 12 by which rotary motion of the rotor 51 is converted to linear motion of the displacing body 2.

The crank mechanism 12 has a crank rod 121. One end portion 122 of the crank rod 121 is rotatably coupled to the rotor 51 by a crank pin 514 that is projectingly disposed at the lateral face of the rotor 51. The other end portion 123 is rotatably coupled to the tip portion 21 of the displacing body 2 by a clamp pin 25 that is projectingly disposed at the tip portion 21 of the displacing body 2.

The crank pin 514 is disposed at a position away from the center of rotation of the rotor 51 in a desired distance.

Here, a radius r1 of a portion (outer circumferential surface 511) where the rotor 51 abuts on the vibrating element 6 is longer than a distance r3 from the center of rotation of the rotor 51 to the crank pin 514.

Thus, the actuator 1 of the present invention can have a decelerating function, and the driving force of the vibrating element 6 can be increased. In other words, the driving force of the vibrating element 6 can be increased without further variable speed mechanism (decelerating mechanism), so that the displacing body 2 can be moved (driven) with relatively great force.

The vibrating element 6, the rotor 51, the crank rod 121, and the displacing body 2 are respectively provided on mutually substantially parallel planes. The vibration of the vibrating element 6 and the displacement of the displacing body 2 are respectively performed in corresponding planes.

The vibrating element 6, the rotor 51, and the displacing body 2 are located on a substantially same plane.

As a result, it is particularly advantageous to make thinner the entire rotation/displacement converting actuator 1.

When the vibrating element 6 undergoes vibration and the rotor 51 is rotated in a desired direction, the displacing body 2 reciprocates in its longitudinal direction by the crank rod 121.

According to the rotation/displacement converting actuator 1, the same effect can be obtained as the effect of the rotation/displacement converting actuator 1 of the above-mentioned sixth embodiment.

Further, the rotation/displacement converting actuator 1 of the seventh embodiment can be made thinner than that of the sixth embodiment, because the vibrating element 6, the rotor 51, and the displacing body 2 are located on the same plane.

Here, in the present invention, the first mode, the second mode, the third mode, and the fourth mode may be provided in a same way as the above-mentioned second embodiment.

Additionally, in the present invention, the displacement restricting means for restricting the displacement of the displacing body 2 may be provided.

Next, an eighth embodiment of a rotation/displacement converting actuator according to the present invention will be described.

Figure 17:
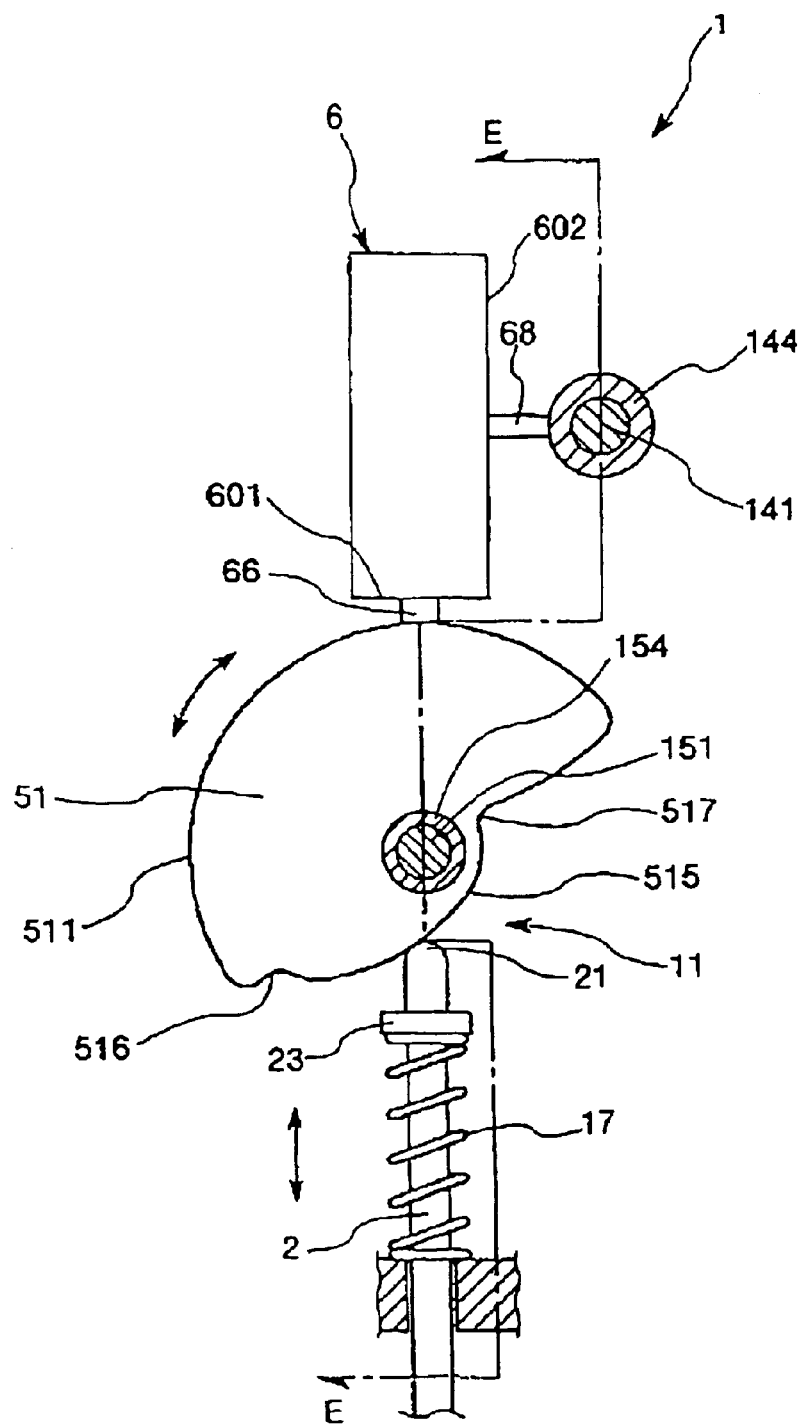
FIG. 17 is a plan view showing an eighth embodiment of the rotation/displacement converting actuator according to the present invention.
Figure 18:
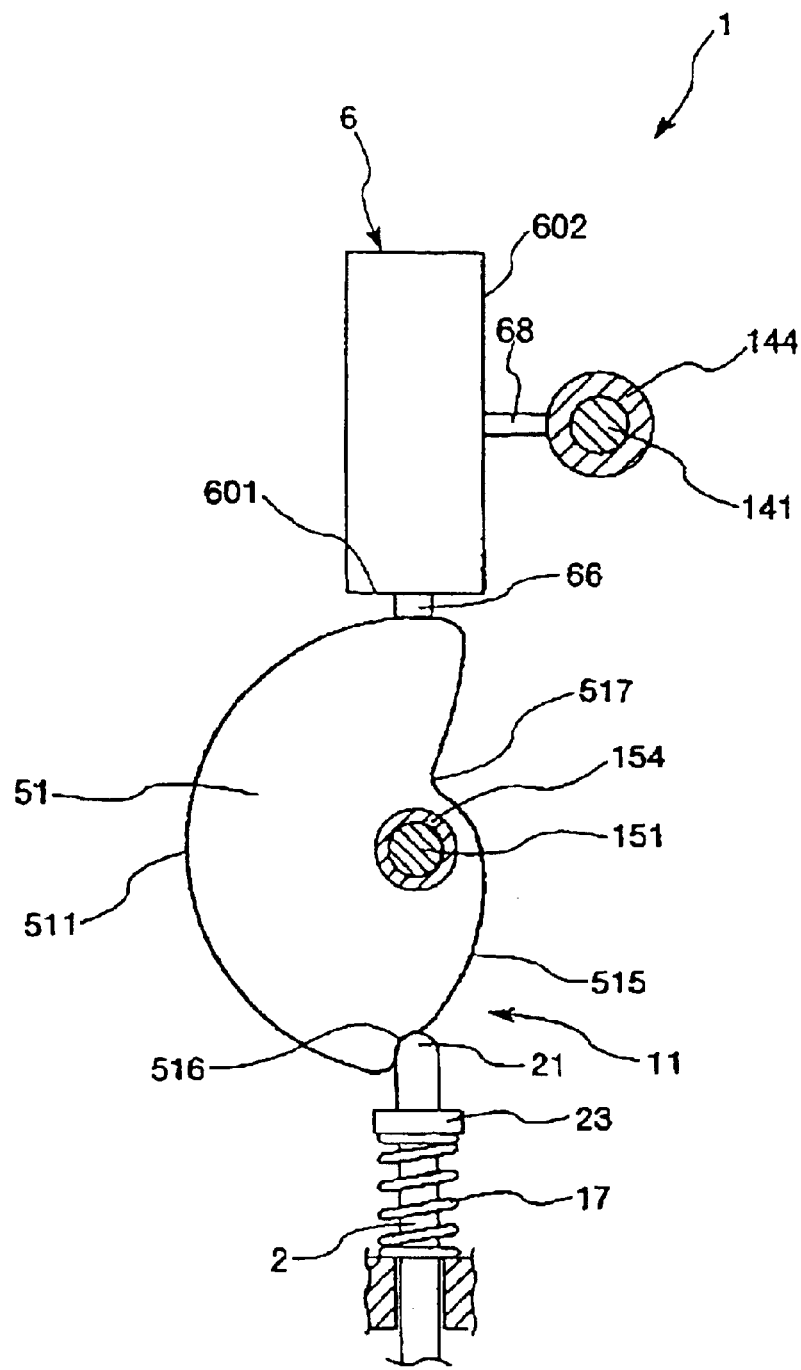
FIG. 18 is a plan view showing the other state of the rotation/displacement converting actuator shown in FIG. 17.
Figure 19:
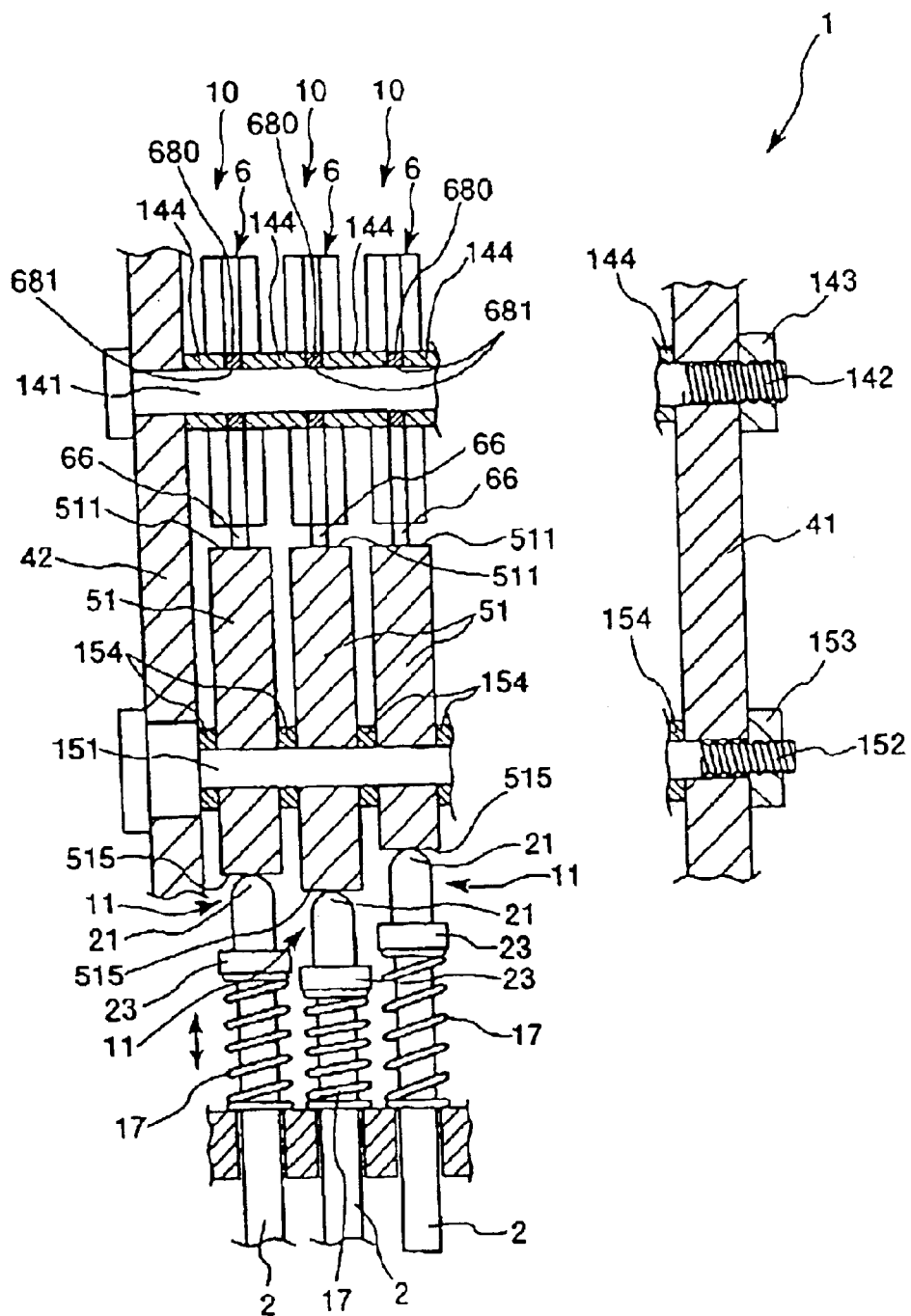
FIG. 19 is a sectional view taken along line E—E of the rotation/displacement converting actuator shown in FIG. 17.

FIG. 17 is a plan view showing the eighth embodiment of a rotation/displacement converting actuator according to the present invention. FIG. 18 is a plan view showing the other sate of the rotation/displacement converting actuator shown in FIG. 17. FIG. 19 is a sectional view taken along line E—E of the rotation/displacement converting actuator show in FIG. 17. Here, in each of FIGS. 17, 18 and 19, the base 41 and the base 42 are not sometimes shown, or sometimes partially shown. In following explanations using FIGS. 17 and 18, an upper side, a lower side, a right side, and a left side are referred to as "upper", "lower", "right" and "left".

Here, a rotation/displacement converting actuator 1 in the eighth embodiment will be described, focusing on different points between the above-mentioned first embodiment and the eighth embodiment. In this regard, explanation of items including the same matters and the like is omitted.

As shown in FIGS. 17, 18 and 19, the rotation/displacement converting actuator 1 in the eighth embodiment has a plurality of actuator units 10, each of which is plate-shaped. Each of the plurality of actuator units 10 is provided with the displacing body 2, the rotor 51 and the vibrating element 6.

In this case, a pair of plate-shaped bases 41, 42 are shared in each of the plurality of actuator units 10.

The displacing directions (arranging directions) of the displacing bodies 2 in the actuator units 10 are substantially coincident so that the actuator units 10 are overlapped in a direction of thickness of the vibrating element 6 (actuator unit 10). Also, the displacing bodies 2 are laterally arranged in a line in FIG. 19.

In this way, the displacing bodies 2 can be concentrated (integrated) by overlapping each of the actuator units 10.

Each of the vibrating elements 6 is supported by a common shaft 141 at each of holes 681so as to be fixed to the shaft 141.

Spacers 144 are respectively provided at positions that correspond to the holding portions 680 between the adjoining vibrating elements 6, between the base 41 and the vibrating elements 6 at the left side end in FIG. 11, and between the base 42 and the vibrating elements 6 at the right side end in FIG. 11.

A screw 142 that is screwed into a nut 143 is formed at a right end portion of the shaft 141 in FIG. 19. The shaft 141 is fixed to the bases 41, 42 in such a way that the screw 142 of the shaft 141 and the nut 143 screw together.

Each of rotors 51 is rotatably supported in forward and reverse directions around a common shaft 151.

Spacers 154 are respectively provided between the rotors 51, between the base 41 and each of the rotors 51, and between the base 42 and each of the rotors. 51.

A screw 152 that is screwed into a nut 153 is formed at a right end portion of the shaft 151 in FIG. 19. The shaft 151 is fixed to the bases 41, 42 in such a way that a screw 153 and the nut 153 screw together.

As shown in FIG. 17, an outer circumferential surface 511 of the rotor 51 partially constitutes a cam surface 515. Two concave portions 516 and 517 are formed at the cam surface 515.

A tip portion (abutting portion) 21 of the displacing body 2 abuts on the cam surface 515 of the rotor 51.

When the vibrating element 6 undergoes vibration and thereby the rotor 51 is rotated counterclockwise in FIG. 17, the tip portion 21 of the displacing body 2 is slidably moved along the cam surface 515, so that the displacing body 2 is displaced downward. Then, as shown in FIG. 18, when the tip portion 21 is moved to the concave portion 516 of the cam surface 515, the tip portion 21 is locked at the concave portion 516. Thus, it can prevent the rotor 51 from being rotated counterclockwise in FIG. 17 and further it can prevent the displacing body 2 from being moved downward. As a result, when the displacing body 2 is displaced downward, the displacing body 2 can be stopped at a desired position.

Likewise, when the vibrating element 6 undergoes vibration and thereby the rotor 51 is rotated clockwise in FIG. 17, the tip portion 21 of the moving body 2 is slidably moved along the cam surface 515, so that the displacing body 2 is moved upward. Then, when the tip portion 21 is moved to the concave portion 517 of the cam surface 515, the tip portion 21 is locked at the concave portion 517. Thus, it can prevent the rotor 51 from being rotated clockwise in FIG. 17 and further it can prevent the displacing body 2 from being moved upward. As a result, when the displacing body 2 is displaced upward, the displacing body 2 can be stopped at a desired position.

In this way, each of the displacing bodies 2 can reciprocate in its longitudinal direction, and the displacing bodies 2 can be surely stopped at a desired position.

Thus, the concave portions 516, 517 and the tip portion 21 of the displacing body 2 constitute a displacement restricting means for restricting displacement of the displacing body 2.

Additionally, in the rotation/displacement converting actuator 1, the vibrating element 6, the rotor 51, the cam surface 515, and the displacing body 2 are located on a substantially same plane. Thereby, it is particularly advantageous to make thinner the entire rotation/displacement converting actuator 1.

According to the rotation/displacement converting actuator 1, the same effect can be obtained as the effect of the rotation/displacement converting actuator 1 of the above-mentioned first embodiment.

In the rotation/displacement converting actuator 1, since each of the actuator units 10 is overlapped in the thickness direction of the vibrating element 6, the rotation/displacement converting actuator 1 can be miniaturized.

Further, according thereto, the rotation/displacement converting actuator 1 can be easily overlapped (laminated), so that the actuator 1 is easy to assembly, because each of the actuator units 10 is plate-shaped so that the each thereof is overlapped in a direction of thickness of the vibrating element 6.

Here, in the present invention, the first mode, the second mode, the third mode, and the fourth mode may be provided in a same way as the above-mentioned second embodiment.

In the eighth embodiment, the cam mechanism 11 is utilized as a mechanism for converting rotary motion of the rotor 51 to linear motion of the displacing body 2. However, in the present invention, in place of such a mechanism, a crank mechanism may be provided, which can convert rotary motion of the rotor 51 to linear motion of the displacing body 2.

Next, a ninth embodiment of a rotation/displacement converting actuator according to the present invention will be described.

Figure 20:
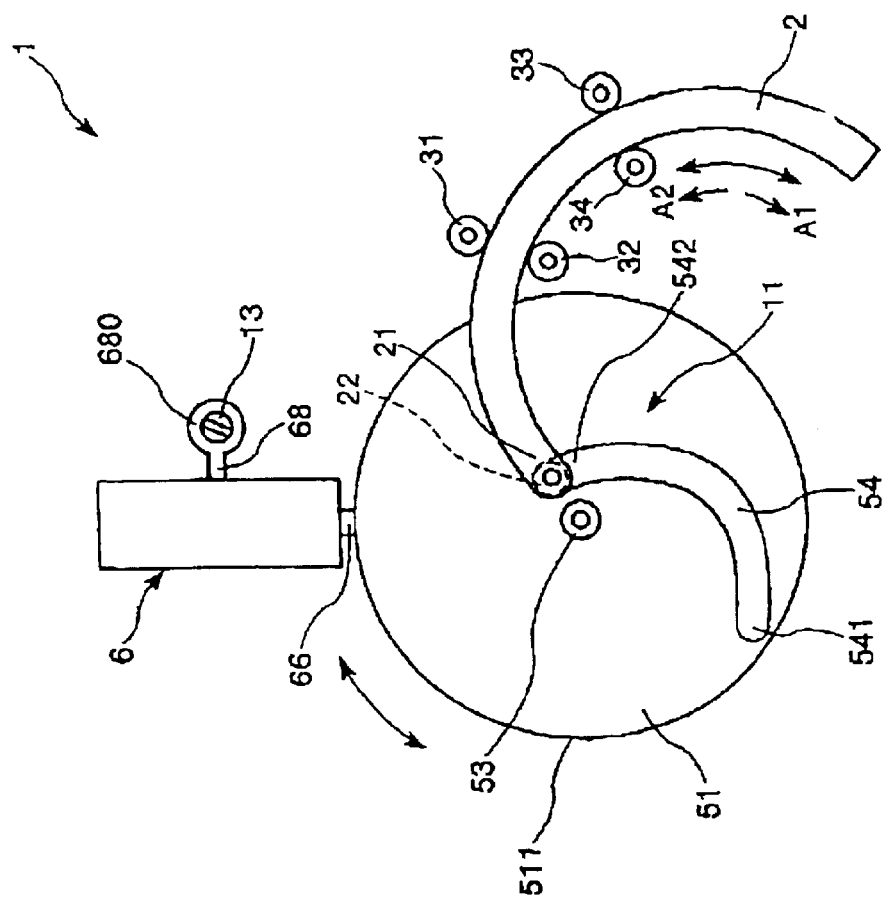
FIG. 20 is a plan view showing a ninth embodiment of the rotation/displacement converting actuator according to the present invention.

FIG. 20 is a plan view showing the ninth embodiment of the rotation/displacement converting actuator according to the present invention. Here, the bases 41, 42 are not shown in FIG. 20. In following explanations using FIG. 20, an upper side, a lower side, a right side, and a left side are referred to as "upper", "lower", "right" and "left".

Here, a rotation/displacement actuator 1 in the ninth embodiment will be described, focusing on different points between the above-mentioned fifth embodiment and the ninth embodiment. In this regard, explanation of items including the same matters and the like is omitted.

A rotation/displacement converting actuator 1 of the ninth embodiment shown in FIG. 20 is an actuator for making a displacing body 2 reciprocate in a substantially circular-shaped manner.

As shown in FIG. 20, the displacing body 2 is substantially shaped, viewing from the plane of FIG. 20. The displacing body 2 is movably provided in the substantially circular-shaped manner, and is supported by two pairs of guide rollers, i.e., a pair of guide rollers (rollers) 31, 32 and a pair of guide rollers 33, 34 that are rotatably provided. In other words, the displacing body 2 is rotatably sandwiched between the guide roller 31 and the guide roller 32. Further, the displacing body 2 is rotatably sandwiched between the guide roller 33 and the guide roller 34 which are located away from the guide roller 33 and the guide roller 34 by a predetermined distance. The displacing body 2 is guided by these guide rollers 31, 32, 33, and 34 so that the displacing body 2 can be displaced (reciprocate) in a substantially arc-shaped manner.

When the vibrating element 6 undergoes vibration, and the rotor 51 is rotated counterclockwise in FIG. 20, the roller 22 is rolled along the cam recess 54 so that the displacing body 2 is moved alone the circular arc in a direction represented by an arrow A1. When the roller 22 is moved to an end portion 541 of the cam recess 54, the roller 22 is locked at the end portion 541. Therefore, the rotor 51 is prevented from being rotated counterclockwise in FIG. 20 and further the displacing body 2 can be prevented from being displaced in the direction of the arrow A1. Namely, when the displacing body 2 is displaced in the direction of the arrow A1, the displacing body 2 can be stopped at a desired position.

Next, when the vibrating element 6 undergoes vibration and the rotor 51 is rotated clockwise in FIG. 20, the roller 22 is rolled along the cam recess 54 so that the displacing body 2 is displaced along the circular arc in a direction represented by an arrow A2. Then, when the roller 22 is moved to an end portion 542 of the cam recess 54, the roller 22 is locked at the end portion 542. Therefore, the rotor 51 is prevented from being rotated clockwise in FIG. 20 and further the displacing body 2 is prevented from being displaced in the direction of the arrow A2. Namely, when the displacing body 2 is displaced in the direction of the arrow A2, the displacing body 2 can be stopped at a desired position.

In this way, the displacing body 2 can reciprocate along the circular arc (in the circular-shaped manner), and the displacing body 2 can be surely stopped at a desired position.

Therefore, the cam recess 54 and the roller 22 constitute a displacement restricting means for restricting displacement of the displacing body 2.

According to the rotation/displacement converting actuator 1, an effect can be obtained as the effect of the rotation/displacement converting actuator 1 of the above-mentioned fifth embodiment.

Further, for example, the rotation/displacement converting actuator 1 can be applied to a mechanism that a door-shaped portion that is circular reciprocates along the circular arc. Needless to say, the application of the rotation/displacement converting actuator 1 is not limited thereto.

Furthermore, the displacing body 2 is displaced (reciprocates) in a substantially circular-shaped manner in the present embodiment. However, the present invention is not limited thereto. For example, so that the displacing body 2 can be displaced (reciprocate) in a direction different from the above-mentioned circular-shaped or linear manner (linearly) by changing various conditions such as a shape of the displacing body 2 and arrangement of the guide rollers.

Here, in the present invention, the first mode, the second mode, the third mode, and the fourth mode may be provided in a same way as the above-mentioned second embodiment.

Next, a tenth embodiment of a rotation/displacement converting actuator according to the present invention will be described.

Figure 21:
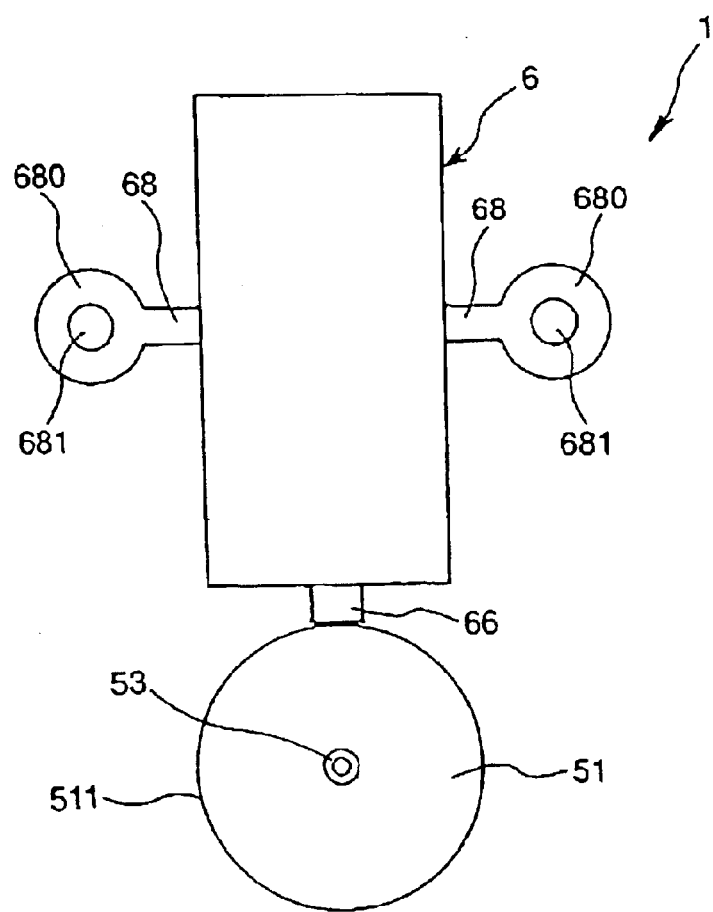
FIG. 21 is a plan view showing the vibrating element in a tenth embodiment of the rotation/displacement converting actuator according to the present invention.

FIG. 21 is a plan view showing the tenth embodiment of the rotation/displacement converting actuator according to the present invention. In following explanation, an upper side, a lower side, a right side, and a left side are referred as to "upper", "lower", "right", and "left".

Here, a rotation/displacement actuator 1 in the tenth embodiment will be described, focusing on different points between the above-mentioned first embodiment and the tenth embodiment. In this regard, explanation of items including the same matters and the like is omitted.

As shown in FIG. 21, in the rotation/displacement converting actuator 1 of the ninth embodiment, a pair of (two) arm portions 68 having elasticity (flexibility) respectively, are integrally formed with the reinforcing plate 63 of the vibrating plate 6.

The pair of arm portions 68 is provided at a substantially center portion in a longitudinal direction of the reinforcing plate 63 (a upper-and-lower direction in FIG. 21) and in a direction substantially orthogonal to the longitudinal direction thereof by way of the reinforcing plate 63 (vibrating element 6). Further, the arm portions 68 are respectively provided so as to project in mutually opposite directions (symmetrical with respect to a vertical direction in FIG. 21).

According to the rotation/displacement converting actuator 1 of the tenth embodiment, an effect can be obtained as the effect of the rotation/displacement converting actuator 1 of the above-mentioned first embodiment.

Further, because the pair of arm portions 68 are provided at the vibrating element 6 in the rotation/displacement converting actuator 1, rigidity against a supporting operation is enhanced, thereby being also able to establish a stable supporting against external force such as reaction by driving operation. Further, through the above-mentioned symmetrical configuration, influence on a clockwise driving characteristic in FIG. 21 (in a right direction) and a counterclockwise driving characteristic in FIG. 21 (in a left direction) can be equalized. The actuator 1 whose characteristics in the forward and reverse directions are even can be realized.

Here, the above-mentioned second to ninth embodiments can be applied to the tenth embodiment.

Next, an eleventh embodiment of a rotation/displacement converting actuator according to the present invention will be described.

Figure 22:
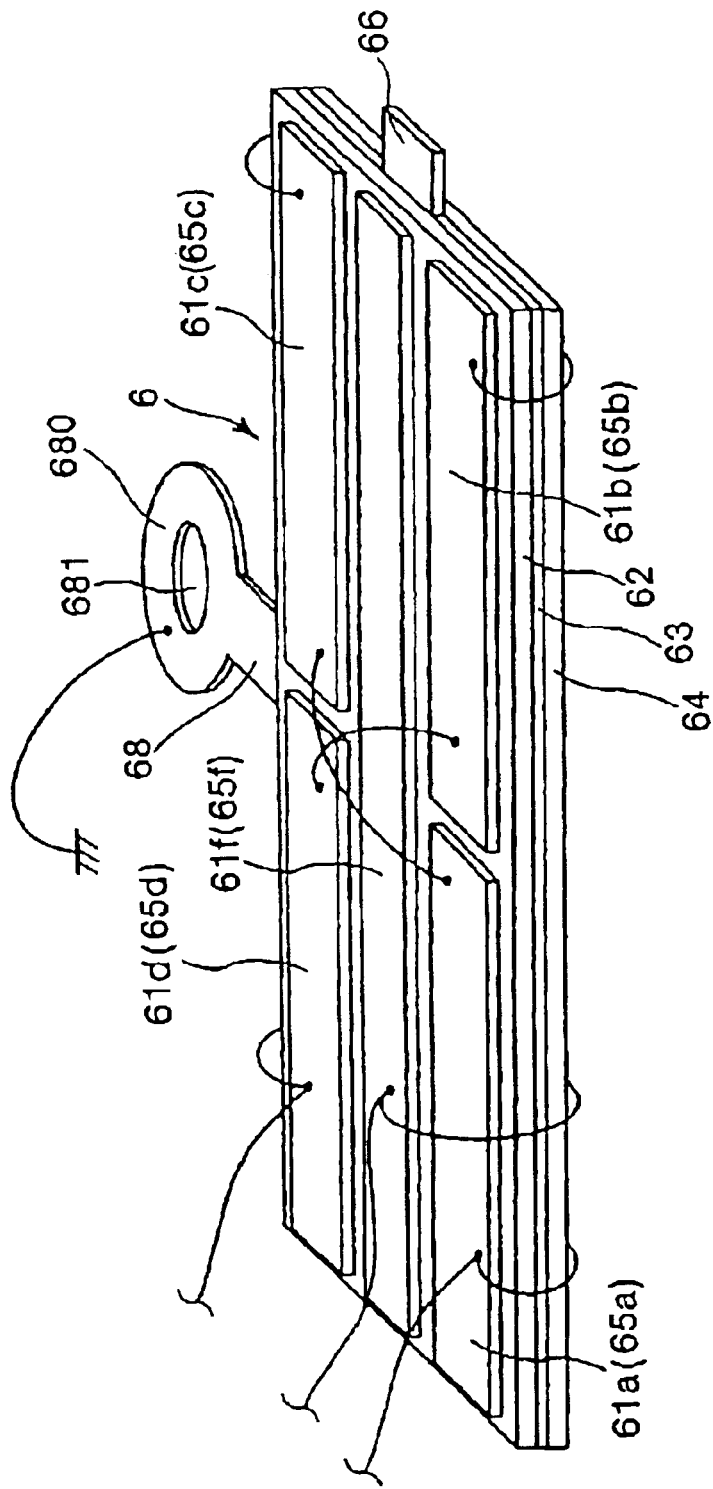
FIG. 22 is an oblique view showing the vibrating element in an eleventh embodiment of the rotation/displacement converting actuator according to the present invention.

FIG. 22 is a perspective view showing the vibrating element in the eleventh embodiment of the rotation/displacement converting actuator according to the present invention. In following explanations using FIG. 22, an upper side, a lower side, a right side, and a left side are referred to as "upper", "lower", "right" and "left".

Here, a rotation/displacement actuator 1 in the eleventh embodiment will be described, focusing on different points between the above-mentioned first to tenth embodiments and the eleventh embodiment. In this regard, explanation of items including the same matters and the like is omitted.

The rotation/displacement converting actuator 1 in the eleventh embodiment has characteristics on the point that the actuator 1 employs the fifth mode and the sixth mode in which a vertical vibration and a bending vibration are combined in addition to the first to fourth modes described in the second embodiment. The fifth mode and the sixth mode can be freely selected by changing a conducting pattern to each of electrodes 61a-61f and 65a-65f in a same way as the first to fourth modes.

The vibrating element 6 of the rotation/displacement converting actuator 1 has an electrode 61f at the upper side of a piezoelectric element 62 in FIG. 22 and an electrode 65f at the lower side thereof in place of the detecting electrodes

61*e* and 65*e* in the second embodiment. The electrodes 61*f* and 65*f* are rectangular and plate-shaped, and has a substantially same length as a length in a longitudinal direction of a vibrating element 6. The electrodes 61*f* and 65*f* are located at a center of the vibrating element 6 along its longitudinal direction. Further, the electrode 61*f* is electrically connected to the electrode 65*f* between the front face and the back face of the vibrating element 6. The electrodes 61*f* and 65*f* are electrically connected to a side of the conducting circuit 20 in a same way as the other electrodes 61*a*–61*d* and 65*a*–65*d* (the electrodes 65*a*–65*d* are not shown).

Figure 23:
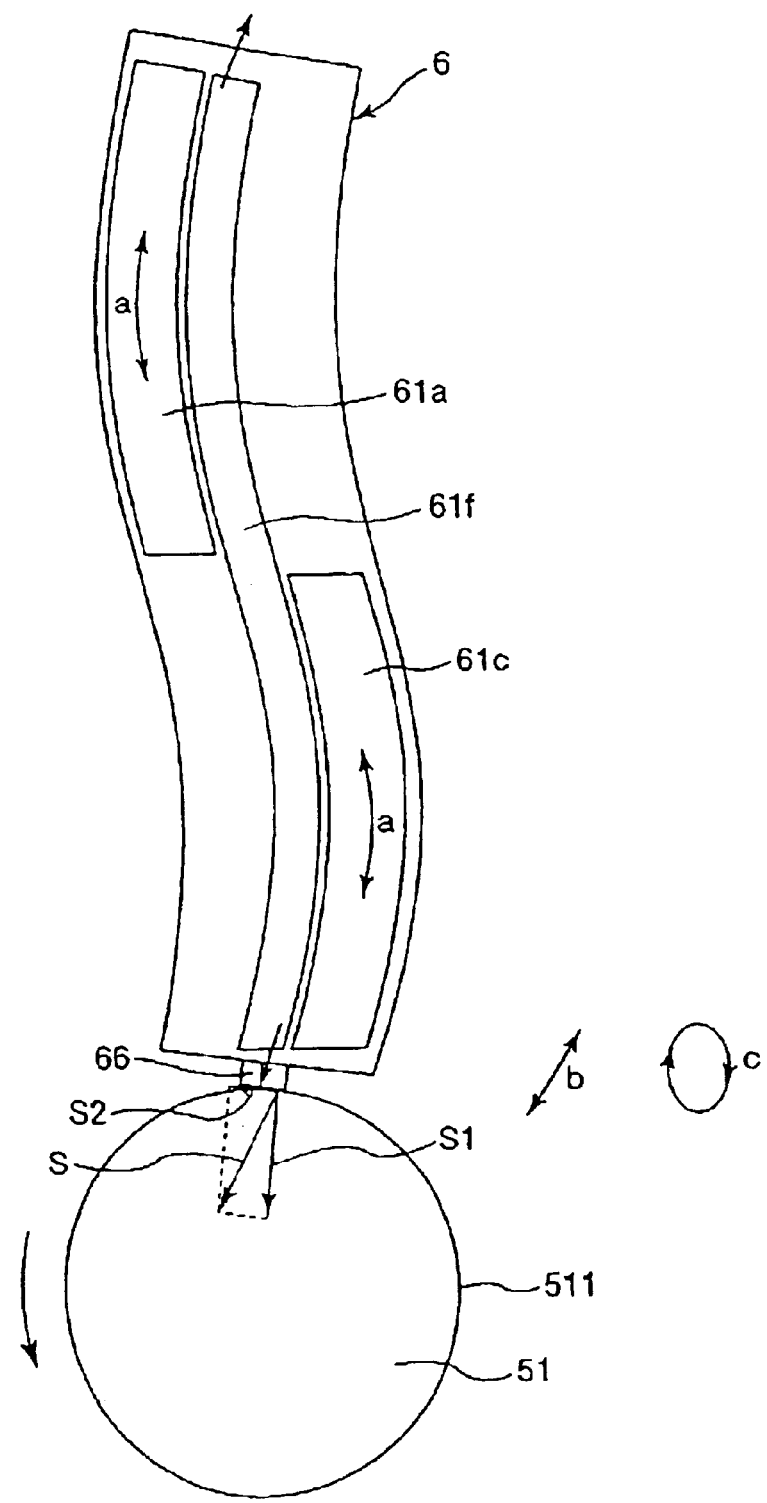
FIG. 23 is a plan view showing a mode of vibration of the vibrating element in the rotation/displacement converting actuator shown in FIG. 22.

FIG. 23 is a plan view showing a mode of vibration of the vibrating element of the rotation/displacement converting actuator shown in FIG. 22.

In the fifth mode of the rotation/displacement converting actuator 1, a power is applied to the electrodes 61*a*, 61*c*, 65*a*, and 65*c* that are located at diagonal lines of the vibrating element 6. An AC voltage is applied between the reinforcing plate 63 and each of the electrodes 61*a*, 61*c*, 65*a*, and 65*c*. Then, portions of the vibrating element 6 corresponding to these electrodes undergo respectively repeatedly extension and contraction so that the entire vibrating element 6 undergoes bending vibration. The protruding portion 66 of the vibrating element 6 undergoes vibration (reciprocates) in a slanting direction represented by an arrow b in FIG. 23, or vibrates (moves) in an elliptical manner as represented by an arrow c. Thus, the rotor 51 repeatedly receives frictional force (pushing force) from the protruding portion 66 so as to be rotated counterclockwise (in the forward direction) in FIG. 23.

In the fifth mode, a power is further applied to the electrodes 61*f* and 65*f* at the center of the vibrating element 6. Then, portions of the vibrating element 6 corresponding to the electrodes repeatedly undergoes extension and contraction with the applied AC voltage so that the entire vibrating element 6 undergoes vertical vibration at minute amplitude in its longitudinal direction. At a protruding portion 66 of the vibrating element 6, since pushing force is increased against the rotor 51 with the vertical vibration, the rotor 51 is rotated with force stronger than in the third mode. Thus, it has an advantage that the driving force of the rotation/displacement converting actuator 1 is enhanced.

In the fifth mode, the electrodes 61*b*, 61*d*, 65*b*, and 65*d* to which the power is not applied constitute a vibration detecting means for detecting vibration of the vibrating element 6. The electrodes 61*b*, 61*d*, 65*b*, and 65*d* detect a voltage (induced voltage) to be induced between the reinforcing plate 63 and each of the electrodes 61*a*, 61*c*, 61*f*, 65*a*, 65*c*, and 65*f* to which the power is applied when the rotation/displacement converting actuator 1 is driven, and thereafter the induced voltage is inputted to an oscillating circuit 81. The oscillating circuit 81 outputs an AC voltage having frequency (resonance frequency) at which amplitude of the vibrating element 6 becomes maximum, i.e., the induced voltage becomes maximum based on the detected induced voltage. Thus, it has an advantage that the rotor 51 can be efficiently rotated. In this regard, the electrodes 61*b*, 61*d*, 65*b*, and 65*d* to which the power is not applied operate in a same way as those in the first embodiment.

Figure 24:
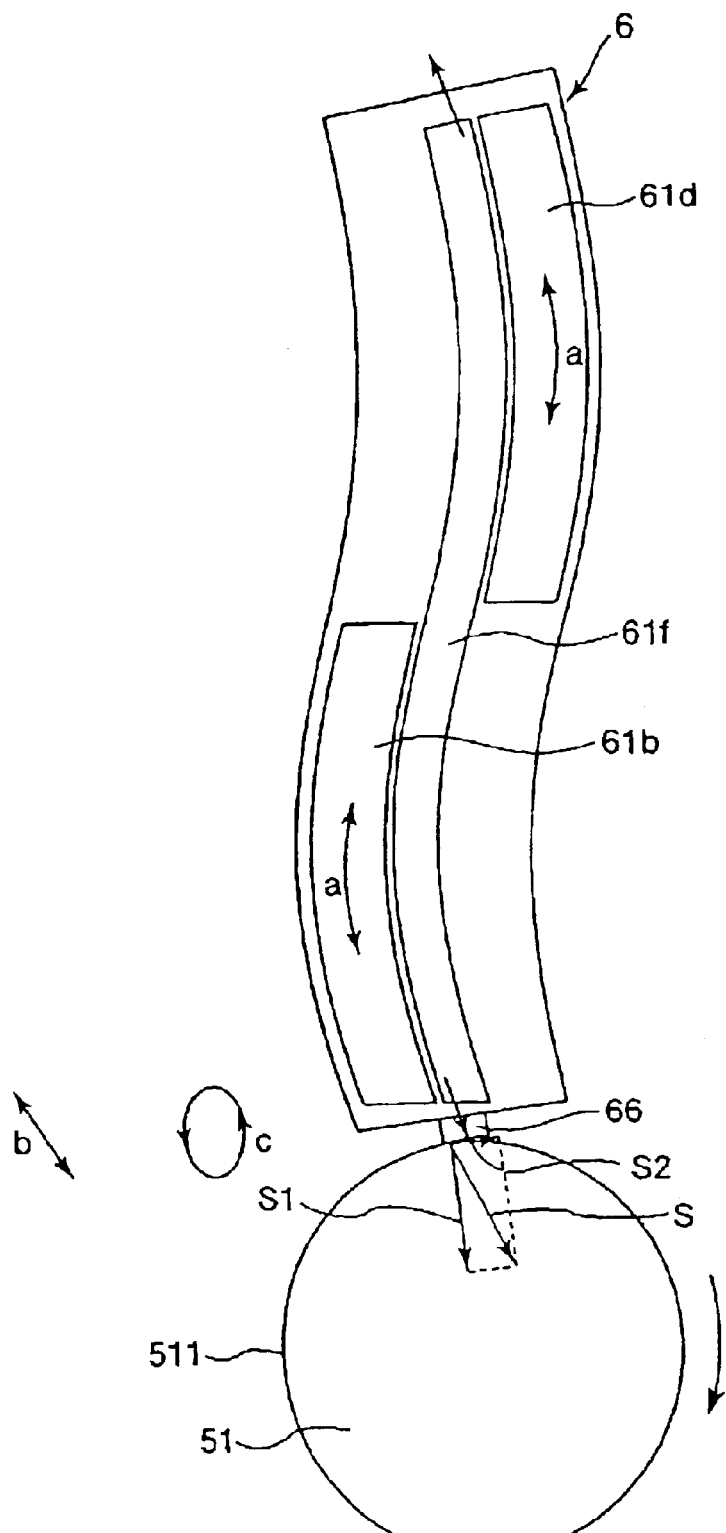
FIG. 24 is a plan view showing a mode of vibration of the vibrating element in the rotation/displacement converting actuator shown in FIG. 22.

FIG. 24 is a plan view showing a mode of vibration of the vibrating element in the rotation/displacement converting actuator shown in FIG. 22.

In the sixth mode of the rotation/displacement converting actuator 1, a power is applied to electrodes 61*b*, 61*d*, 65*b*, and 65*d* that are located at diagonal lines of the vibrating element 6, and electrodes 61*f* and 65*f* that are located at the center of the vibrating element 6. The vibrating element 6 undergoes vibration with motion symmetric in case of the fifth mode, and the rotor 51 is rotated clockwise (in the reverse direction) in FIG. 24. Thus, it has an advantage that stronger driving force can be also obtained regarding such rotation in the reverse direction. In this regard, the other electrodes 61*a*, 61*c*, 65*a*, and 65*c* to which a power is not applied constitute a vibration detecting means for detecting vibration of the vibrating element 6. These operations and effects are as same as those of the electrodes 61*b*, 61*d*, 65*b*, and 65*d* in the fifth mode.

In the rotation/displacement converting actuator 1, an arm portion 68 supports a vibrational node of both vertical vibration and bending vibration when the vibrating element 6 is driven, which is at a lateral side of the vibrating element 6. The point of the vibrational node may be appropriately decided within an obvious scope of one skilled in the art using known methods such as vibration analysis. For example, in a case where the electrodes 61*a* to 61*d* and the electrodes 65*a* to 65*d* are symmetrically disposed in the longitudinal direction and the width direction of the vibrating element 6, the vibrational node may be located at substantially center of the vibrating element 6. If the arm portion 68 is disposed at such a position, the rotor 51 can be efficiently rotated because vibration leakage (vibrational waste) from the arm portion 68 to an external portion can be prevented. Thus, it has an advantage that the displacing body 2 can be efficiently displaced (driven).

As mentioned above, in this rotation/displacement converting actuator 1, the reinforcing plate 63, the protruding portion 66 and the arm portion 68 are integrally formed by a single member. Thus, it has an advantage that vibration of the vibrating element 6 can be effectively transmitted to the rotor 51 and the vibrating element 6 can be more surely supported, because a firm coupling relationship can be established among the reinforcing plate 63, the protruding portion 66, and the arm portion 68.

Here, in a case where the rotor 61 is rotated in a single direction, for example, following configurations of the vibrating element 6 may be employed.

For example, in a case where the rotor 51 is rotated only counterclockwise (in the forward direction) in FIG. 23, a single electrode unit (not shown) in which the electrodes 61*a*, 61*c*, and 61*f* are connected (integrated), may be provided at a position as same as the position where the electrodes 61*a*, 61*c*, and 61*f* are arranged in place of the electrodes 61*a*, 61*c*, and 61*f*. Further, a single electrode unit (not shown) in which the electrodes 65*a*, 65*c*, and 65*f* are connected (integrated), may be provided at a position as same as the position where the electrodes 65*a*, 65*c*, and 65*f* are arranged in place of the electrodes 65*a*, 65*c*, and 65*f*.

Alternatively, for example, in a case where the rotor 51 is rotated only clockwise (in the reverse direction) in FIG. 24, a single electrode unit (not shown) in which the electrodes 61*b*, 61*d*, and 61*f* are connected (integrated), may be provided at a position as same as the position where the electrodes 61*b*, 61*d*, and 61*f* are arranged in place of the electrodes 61*a*, 61*c*, and 61*f*. Further, a single electrode unit (not shown) in which the electrodes 65*a*, 65*c*, and 65*f* are connected (integrated), may be provided at a position as same as the position where the electrodes 65*b*, 65*d*, and 65*f* are arranged in place of the electrodes 65*b*, 65*d*, and 65*f*.

The position of the protruding portion 66 of the vibrating element 6 is not limited to a center portion in the short side of the vibrating element 6. In this case, for example, the protruding portion 66 may be located at a position offset from the center portion of the short side of the vibrating element 6, i.e., at a position offset from on the centerline of the longitudinal direction of the vibrating element 6. According to such a configuration, there occur (1) unbalanced state of weight of the vibrating element 6 by offset of the setting position of the protruding portion 66; (2) unbalanced state owing that reaction force from the rotor 51 effects the vibrating element 6 out the centerline of the vibrating element 6; and the like. In this case, when the vibrating element 6 undergoes extension and contraction by supplying a power to the vibrating element 6, a complex vibration of combination of vertical vibration and bending vibration is readily induced. Thus, it has an advantage that driving efficiency of the vibrating element 6 can be enhanced.

Additionally, in the rotation/displacement converting actuator 1 having the above-mentioned configuration, there may occur (3) unbalance state of weight of the vibrating element 6 caused by unbalance of shape and/or arrangement of electrodes to drive the vibrating element 6.

These operations (configurations) of items (1), (2), and (3) occur independently. Therefore, only one operation may be selected from them. On the other hand, two or three operations may be selected from them in order to combine them.

In this regard, the above-mentioned modifications may be applied to the rotation/displacement converting actuator in any of the first to tenth embodiments.

Figure 25:
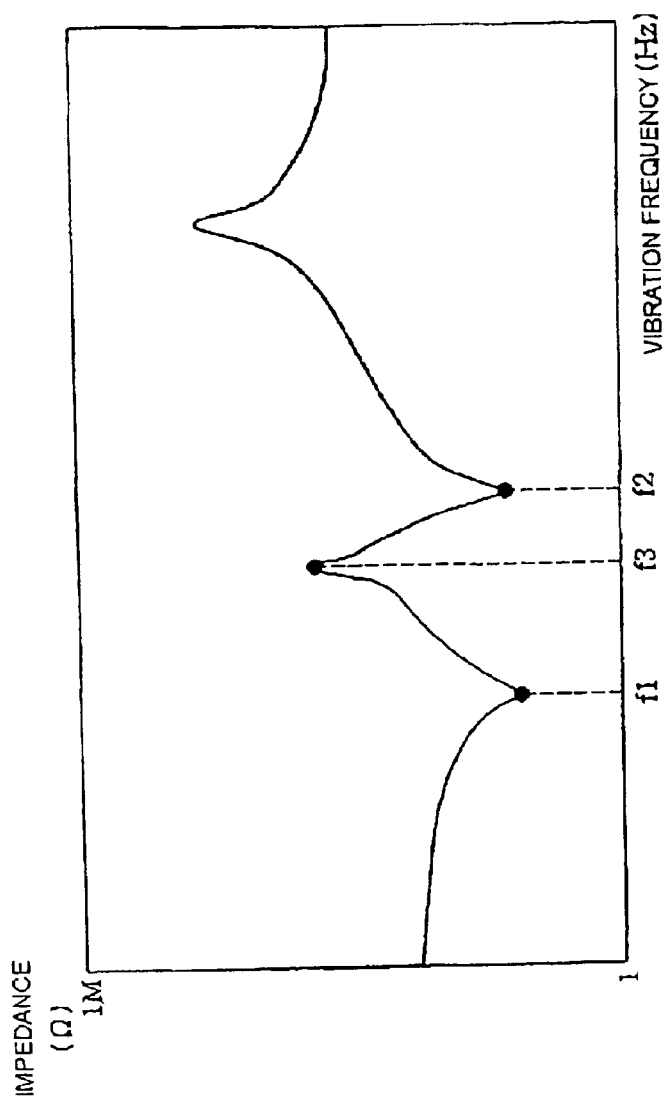
FIG. 25 is a graph showing a driving characteristic of the vibrating element in the rotation/displacement converting actuator shown in FIG. 22.

FIG. 25 is a graph showing a driving characteristic of the vibrating element in the rotation/displacement converting actuator shown in FIG. 22.

In FIG. 25, this graph shows vibration characteristic of the vibrating element, the horizontal axis represents vibration frequency (Hz), and the vertical axis represents impedance (ohm). In this case, this vibration frequency is the vibration frequency of the vibrating element 6 at the driving time. Further, the impedance is the impedance of the piezoelectric elements 62, 64 in the state where there is no pushing force.

In the rotation/displacement converting actuator 1, by combining the vertical vibration and the bending vibration as described above, the rotor 51 is biased by the protruding portion 66 of the vibrating element 6 with great pushing force. In this regard, in the rotation/displacement converting actuator 1, the various conditions of the vibrating element 6 are set so that resonance frequency f1 of the vertical vibration of the vibrating element 6 and resonance frequency f2 of the bending vibration of the vibrating element 6 are different (shifted). As a result, near the resonance point in the pushing state, the change in the impedance of the piezoelectric elements 62, 64 becomes smaller, and the impedance becomes larger, whereby the resonance frequencies of the vertical vibration and the bending vibration become unclear. Thus, it is possible to excite combined vertical vibration and bending vibration in a wide frequency band, and there is an advantage that it is possible to stabilize the power supplied at the time the vibrating element 6 is driven.

In this regard, these resonance frequencies f1, f2 are the vibration frequencies (driving frequencies) at the time the impedance becomes very small (see FIG. 25).

Further, in the rotation/displacement converting actuator 1, the vibrating element 6 is driven at a desired vibration frequency (driving frequency) between the resonance frequency f1 of the vertical vibration and the resonance frequency f2 of the bending vibration.

In this case, when the driving frequency of the vibrating element 6 approaches the resonance frequency f1 of the vertical vibration, because the amplitude of vibration in the direction where the pushing force is increased (in a radial direction of the rotor 51) becomes larger, the frictional force between the protruding portion 66 of the vibrating element 6 and the rotor 51 becomes greater, and thus, the driving force is enhanced (i.e., this forms highly driving force system).

Additionally, when the driving frequency of the vibrating element 6 approaches the resonance frequency f2 of the bending vibration, a component regarding vibration displacement of the protruding portion 66 of the vibrating element 6 in the displacing direction of the rotor 51 (in the peripheral direction of the rotor 51) becomes larger, whereby an amount of displacement by a single vibration by the vibrating element 6 becomes larger, and the driving speed (displacing speed) is enhanced (i.e., this forms a high-speed system).

In this way, by shifting the resonance frequency f1 of the vertical vibration and the resonance frequency f2 of the bending vibration, and by properly establishing (selecting) the driving frequency in the frequency band between f1 and f2, it is possible to obtain any driving characteristics related to the driving force and the driving speed, for example.

In the rotation/displacement converting actuator 1, the resonance frequency f2 of the bending vibration is preferably larger than about 0.5 to 3%, and more preferably lager than about 1 to 2% of the resonance frequency f1 of the vertical vibration.

By setting the difference between the resonance frequency f2 of the bending vibration and the resonance frequency f1 of the vertical vibration within the range described above, because vertical vibration and bending vibration occur (i.e., they are combined) at the same time in the pushing state, frictional force and driving force can be simultaneously obtained, and this makes it possible to obtain good driving characteristics.

On the contrary thereto, the resonance frequency f1 of the vertical vibration may be larger than the resonance frequency f2 of the bending vibration. In this case, the resonance frequency f1 of the vertical vibration is preferably larger than about 0.5 to 3%, and more preferably larger than about 1 to 2% of the resonance frequency f2.

Further, in the rotation/displacement converting actuator 1, the impedance at the resonance frequency f2 of the bending vibration is larger than the impedance at the resonance frequency f1 of the vertical vibration, and there is a frequency f3 having very large impedance between the resonance frequencies f1 and f2. The vibrating element 6 is preferably driven at a desired driving frequency between the resonance frequency f1 of the vertical vibration and the resonance frequency f2 of the bending vibration, and is more preferably driven at a desired driving frequency between the frequency f3 and the frequency f2.

Thus, it is possible to excite vertical vibration and bending vibration at shifted vibration phases when the vibrating element 6 is driven. Accordingly, it is possible to vibrate the protruding portion 66 along an elliptical path c (see FIGS. 23 and 24), the force from the vibrating element 6 can be efficiently transmitted to the rotor 51 without any restoring force being applied to the rotor 51.

As mentioned above, the rotation/displacement converting actuator 1 in the eleventh embodiment can be operated efficiently.

Additionally, in order to obtain larger mechanical output, preferably, the resonance frequency f1 of the vertical vibration corresponds with the resonance frequency f2 of the bending vibration so that impedance in the resonance frequency is lowered, and the vibrating element 6 is driven at this resonance frequency. Thus, the rotation/displacement converting actuator whose mechanical output is larger can be realized.

As mentioned above, the rotation/displacement converting actuator 1 of the present invention in the eleventh embodiment can obtain a larger output.

In the descriptions given above, some aspects of the rotation/displacement converting actuator of the present invention have been described based on the embodiments shown in the drawings, but the present invention is not limited to them, and it is possible to replace the structure of each portion with any structure having the similar function.

Further, in the present invention, two or more of the configurations (features) of any of the embodiments described above may be appropriately combined.

Further, in the present invention, a displacing direction of the displacing body 2 is not limited to a linear-like (linear) or a circular like (along the circular arc) direction. For example, the displacing body 2 can be displaced in a desired direction in a plane that is substantially parallel with a direction of vibration of the vibrating element 6 or a desired direction in a plane in which the direction of the vibration of the vibrating element 6 exits.

In other words, a converting mechanism used in the present invention is not limited to a mechanism for converting rotary motion of the rotor 51 to linear motion of a displacing body 2 and a mechanism for converting rotary motion of the rotor 51 to a circular-like motion of the displacing body 2.

Further, in the present invention, the shape and the configuration of the vibrating element 6 are not limited to those shown in the drawings, i.e., it is possible to employ any other shape, for example, the shape in which the width of the vibrating element is gradually reduced toward a portion (abutting portion) on which the rotor abuts.

Further, in the embodiments described above, one vibrating element 6 was provided in one actuator unit 10, but in the present invention, a plurality of vibrating elements 6 may be provided in one actuator unit 10 (the rotor 51).

Finally, applications of the rotation/displacement converting actuator of the present invention are not particularly limited. For example, the present invention can be applied to various electronic devices in order to drive Braille (a plurality of pins) in a device for displaying the Braille, in order to drive a plurality of pins in a device for giving a finger or the like a touch sensation, or in order to drive an antenna of a cellular phone (including "PHS"), a mobile television, a TV telephone, or the like.

Industrial Application

As described above, in accordance with the present invention, a displacing body can be accurately and surely displaced (reciprocate) in a desired direction e.g., linearly.

The entire rotation/displacement converting actuator can be miniaturized, particularly become thinner, because a rotor can be rotated by a vibrating element and thereafter rotary motion of the rotor is converted to a reciprocal motion (e.g., linear motion) of a displacing body, thereby displacing (driving) the displacing body.

The displacing body can be displaced (driven) with greater force in comparison with a case where the vibrating element directly drives the displacing body, because the actuator can have a decelerating function.

The entire configuration can be simplified, and its cost of production can be reduced.

Harmful effects against peripheral equipments can be prevented, because no or little electromagnetic noise occurs in the actuator in order not to utilize any ordinary motor.

What is claimed is:

1. A rotation/displacement converting actuator comprising:
   a rotor provided in a rotatable manner;
   a vibrating element which includes a first piezoelectric element that undergoes extension and contraction by application of an AC voltage, a reinforcing plate having an abutting portion and an arm portion, and a second piezoelectric element that undergoes extension and contraction by application of an AC voltage, the first piezoelectric element, the reinforcing plate and the second piezoelectric element being laminated in this order, and the vibrating element being supported by the arm portion so that the abutting portion abuts on said rotor wherein said vibrating element undergoes vibration by applying an AC voltage to the first and second piezoelectric elements so that said vibrating element repeatedly applies force to said rotor by the vibration to rotate said rotor;
   a displacing body movably provided along a substantially arc-shaped path co-planar with a plane in which the vibration occurs or in a plane substantially parallel with the plane in which the vibration occurs; and
   a converting mechanism for converting rotary motion of said rotor to reciprocal motion of said displacing body along the substantially arc-shaped path.

2. The rotation/displacement converting actuator according to claim 1, wherein said vibrating element, said rotor, and said displacing body are respectively arranged in mutually substantially parallel planes, and the vibration of said vibrating element and the reciprocal motion of said displacing body are performed in the respective parallel planes.

3. The rotation/displacement converting actuator according to claim 1, wherein the converting mechanism includes a cam mechanism provided with a cam having a cam recess.

4. The rotation/displacement converting actuator according to claim 1, further comprising displacement restricting means for restricting displacement of said displacing body.

5. The rotation/displacement converting actuator according to claim 1, wherein said vibrating element abuts on said rotor from a radial direction of said rotor.

6. The rotation/displacement converting actuator according to claim 1, wherein said rotor has a circumferential surface, and said vibrating element abuts on the circumferential surface of said rotor.

7. A rotation/displacement converting actuator comprising:
   a rotor provided in a rotatable manner;
   a vibrating element which includes a first piezoelectric element that undergoes extension and contraction by application of an AC voltage, a reinforcing plate having an abutting portion and an arm portion, and a second piezoelectric element that undergoes extension and contraction by application of an AC voltage, the first piezoelectric element, the reinforcing plate and the second piezoelectric element being laminated in this order, and the vibrating element being supported by the arm portion so that the abutting portion abuts on said rotor wherein said vibrating element undergoes vibration by applying an AC voltage to the first and second piezoelectric elements so that said vibrating element repeatedly applies force to said rotor by the vibration to rotate said rotor;
   a displacing body provided in a linearly movable manner; and
   a converting mechanism for converting rotary motion of said rotor to reciprocal motion of said displacing body, wherein said converting mechanism includes a cam mechanism provided with a cam having a circumferential cam surface, the cam being concentrically provided on said rotor, and wherein said rotor has an outer circumferential surface on which said vibrating element abuts, and the distance between the outer circumferential surface and the center of rotation of said rotor is longer than a maximum distance from the center of rotation of the cam to the cam surface of the cam.

8. The rotation/displacement converting actuator according to claim 7, wherein said vibrating element, said rotor, the cam surface of said cam mechanism, and said displacing body are respectively provided in mutually substantially parallel planes, and the vibration of said vibrating element and the displacement of said displacing body are performed in the respective parallel planes.

9. The rotation/displacement converting actuator according to claim 7, wherein the cam of the cam mechanism is adapted to rotate together with said rotor.

10. The rotation/displacement converting actuator according to claim 7, wherein the cam of the cam mechanism includes a cam recess.

11. The rotation/displacement converting actuator according to claim 7, wherein said displacing body has an abutting portion that abuts on the cam surface of the cam mechanism, and said actuator further comprises biasing means for biasing said displacing body so that the abutting portion abuts on the cam surface.

12. The rotation/displacement converting actuator according to claim 7, wherein said displacing body is constituted so as to perform the reciprocal motion by the rotary motion of said rotor in one direction.

13. A rotation/displacement converting actuator comprising:

a rotor provided in a rotatable manner;

a vibrating element which includes a first piezoelectric element that undergoes extension and contraction by application of an AC voltage, a reinforcing plate having an abutting portion and an arm portion, and a second piezoelectric element that undergoes extension and contraction by application of an AC voltage, the first piezoelectric element, the reinforcing plate and the second piezoelectric element being laminated in this order, and the vibrating element being supported by the arm portion so that the abutting portion abuts on said rotor wherein said vibrating element undergoes vibration by applying an AC voltage to the first and second piezoelectric elements so that said vibrating element repeatedly applies force to said rotor by the vibration to rotate said rotor;

a displacing body provided in a linearly movable manner; and a converting mechanism for converting rotary motion of said rotor to reciprocal motion of said displacing body, wherein said rotor has an inner circumferential surface inside thereof, and said vibrating element abuts on the inner circumferential surface of said rotor from the inside of said rotor.

14. The rotation/displacement converting actuator according to claim 13, wherein said converting mechanism includes a cam mechanism provided with a cam having a cam surface, said rotor has an outer circumferential surface, and the outer circumferential surface of said rotor constitutes the cam surface of the cam of the cam mechanism.

15. The rotation/displacement converting actuator according to claim 13, wherein the cam of the cam mechanism includes a cam recess.

16. The rotation/displacement converting actuator according to claim 13, wherein said displacing body has an abutting portion that abuts on the cam surface of the cam mechanism, and said actuator further comprises biasing means for biasing said displacing body so that the abutting portion abuts on the cam surface.

17. The rotation/displacement converting actuator according to claim 13, wherein the portion of said rotor on which said vibrating element abuts and the cam surface of the cam mechanism are located in a substantially same plane.

18. The rotation/displacement converting actuator according to claim 13, wherein said displacing body is constituted so as to perform the reciprocal motion by the rotary motion of said rotor in one direction.

* * * * *